US011323941B2

(12) United States Patent
Sugai et al.

(10) Patent No.: US 11,323,941 B2
(45) Date of Patent: May 3, 2022

(54) COMMUNICATION DEVICE AND COMMUNICATION METHOD FOR REALIZING HIGH-SPEED COMMUNICATION BY MULTI-USER COMMUNICATION OR SPATIAL REUSE TECHNOLOGY

(71) Applicant: SONY CORPORATION, Tokyo (JP)

(72) Inventors: Ren Sugai, Kanagawa (JP); Kosuke Aio, Kanagawa (JP); Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 128 days.

(21) Appl. No.: 16/632,952

(22) PCT Filed: Jun. 11, 2018

(86) PCT No.: PCT/JP2018/022156
§ 371 (c)(1),
(2) Date: Jan. 22, 2020

(87) PCT Pub. No.: WO2019/026427
PCT Pub. Date: Feb. 7, 2019

(65) Prior Publication Data
US 2020/0169931 A1 May 28, 2020

(30) Foreign Application Priority Data
Aug. 3, 2017 (JP) .............................. JP2017-150578

(51) Int. Cl.
*H04W 36/22* (2009.01)
*H04W 28/08* (2009.01)
(Continued)

(52) U.S. Cl.
CPC ....... *H04W 36/22* (2013.01); *H04W 28/0808* (2020.05); *H04W 28/0835* (2020.05);
(Continued)

(58) Field of Classification Search
CPC ..... H04W 36/08; H04W 36/22; H04W 36/38; H04W 80/02; H04W 36/0005;
(Continued)

(56) References Cited

U.S. PATENT DOCUMENTS 9,526,047 B1\* 12/2016 Ho ......................... H04W 36/22
10,271,340 B1\* 4/2019 Pawar ................... H04L 5/0055
(Continued)

FOREIGN PATENT DOCUMENTS

AR          050870 A1      11/2006
AU       2009243501 A1     12/2009
(Continued)

OTHER PUBLICATIONS

International Search Report and Written Opinion of PCT Application No. PCT/JP2018/022156, dated Aug. 21, 2018, 08 pages of ISRWO.
(Continued)

*Primary Examiner* — Magdi Elhag
(74) *Attorney, Agent, or Firm* — Chip Law Group

(57) ABSTRACT

Provided is a communication device that favorably implements SR communication and MU communication. A communication device that operates as a base station includes a determination unit that determines a communication status in a BSS of the communication device, and a control unit that controls transmission and reception of a signal regarding connection change of a terminal according to the communication status to and from a surrounding base station. The determination unit determines the presence of a small number of terminals falling outside a distribution of implementation statuses of spatial reuse communication or multi user communication of entire subordinate terminals, and transmits a signal requesting the small number of terminals to be connected to the surrounding base station or transmits
(Continued)

a signal inquiring of the surrounding base station acceptance of the small number of terminals.

16 Claims, 28 Drawing Sheets

(51) Int. Cl.
*H04W 36/08* (2009.01)
*H04W 36/38* (2009.01)
*H04W 36/28* (2009.01)

(52) U.S. Cl.
CPC ........... *H04W 36/08* (2013.01); *H04W 36/28* (2013.01); *H04W 36/38* (2013.01)

(58) Field of Classification Search
CPC ......... H04W 36/0009; H04W 36/0085; H04W 16/28; H04W 36/16; H04W 84/12; H04W 92/20; H04W 36/28; H04W 36/30; H04W 28/0236; H04W 28/0268; H04W 28/08; H04W 28/0804; H04W 28/0806; H04W 28/0812; H04W 28/0835
See application file for complete search history.

(56) References Cited

U.S. PATENT DOCUMENTS

| | | | |
|---|---|---|---|
| 10,616,814 B2* | 4/2020 | Ha | H04W 36/22 |
| 2004/0176094 A1 | 9/2004 | Kim et al. | |
| 2006/0056348 A1 | 3/2006 | Marinier et al. | |
| 2007/0081449 A1* | 4/2007 | Khan | H04W 52/143 |
| | | | 370/208 |
| 2008/0233967 A1* | 9/2008 | Montojo | H04W 72/082 |
| | | | 455/452.2 |
| 2009/0149179 A1 | 6/2009 | Shim et al. | |
| 2009/0290555 A1* | 11/2009 | Alpert | H04W 36/30 |
| | | | 370/331 |
| 2010/0202409 A1 | 8/2010 | Marinier et al. | |
| 2012/0014353 A1 | 1/2012 | Marinier et al. | |
| 2014/0254355 A1* | 9/2014 | Soliman, Sr. | G06Q 30/0207 |
| | | | 370/229 |
| 2015/0036661 A1 | 2/2015 | Marinier et al. | |
| 2017/0034758 A1* | 2/2017 | Lai | H04W 24/10 |
| 2018/0255502 A1 | 9/2018 | Shim et al. | |
| 2019/0387454 A1 | 12/2019 | Shim et al. | |

FOREIGN PATENT DOCUMENTS

| | | |
|---|---|---|
| CA | 2517736 A1 | 9/2004 |
| CA | 2579839 A1 | 3/2006 |
| CN | 1757183 A | 4/2006 |
| CN | 101675604 A | 3/2010 |
| CN | 103079244 A | 5/2013 |
| CN | 105050157 A | 11/2015 |
| EP | 1458209 A2 | 9/2004 |
| EP | 2071890 A2 | 6/2009 |
| GE | P20125470 B | 4/2012 |
| HR | P20090686 A2 | 2/2010 |
| JP | 2006-520119 A | 8/2006 |
| JP | 10-0640344 B1 | 10/2006 |
| JP | 4430016 B2 | 3/2010 |
| JP | 2011-507384 A | 3/2011 |
| JP | 4810516 B2 | 11/2011 |
| JP | 5559110 B2 | 7/2014 |
| JP | 5629791 B2 | 11/2014 |
| JP | 2015-057912 A | 3/2015 |
| JP | 2015-088782 A | 5/2015 |
| JP | 5806265 B2 | 11/2015 |
| JP | 2016-129406 A | 7/2016 |
| KR | 10-2004-0079661 A | 9/2004 |
| KR | 10-2009-0061244 A | 6/2009 |
| KR | 10-2012-0044952 A | 5/2012 |
| KR | 10-2012-0093796 A | 8/2012 |
| KR | 10-2013-0009933 A | 1/2013 |
| KR | 10-2013-0069679 A | 6/2013 |
| KR | 10-2014-0007981 A | 1/2014 |
| KR | 10-2014-0134256 A | 11/2014 |
| RU | 2009141829 A | 5/2011 |
| TW | 200709698 A | 3/2007 |
| TW | 200931992 A | 7/2009 |
| TW | 200935948 A | 8/2009 |
| TW | 201043065 A | 12/2010 |
| TW | 201404232 A | 1/2014 |
| TW | I433566 B | 4/2014 |
| TW | 201536072 A | 9/2015 |
| WO | 2004/079949 A1 | 9/2004 |
| WO | 2006/031588 A2 | 3/2006 |
| WO | 2009/075486 | 6/2009 |

OTHER PUBLICATIONS

Extended European Search Report of EP Application No. 18841440.3, dated Apr. 29, 2020, 11 pages of EESR.
Extended European Search Report of EP Application dated Jun. 28, 2021.

* cited by examiner

COMMUNICATION DEVICE AND COMMUNICATION METHOD FOR REALIZING HIGH-SPEED COMMUNICATION BY MULTI-USER COMMUNICATION OR SPATIAL REUSE TECHNOLOGY

CROSS REFERENCE TO RELATED APPLICATIONS

This application is a U.S. National Phase of International Patent Application No. PCT/JP2018/022156 filed on Jun. 11, 2018, which claims priority benefit of Japanese Patent Application No. JP 2017-150578 filed in the Japan Patent Office on Aug. 3, 2017. Each of the above-referenced applications is hereby incorporated herein by reference in its entirety.

TECHNICAL FIELD

The technology disclosed in the present specification relates to a communication device and a communication method for realizing high-speed communication by multi user communication or spatial reuse technology.

BACKGROUND ART

Wireless local area network (LAN) is expected to realize higher-speed communication with dynamic sensitivity control (DSC) that is one of uplink multi user (UL MU) communication and spatial reuse (SR) technology. Here, the UL MU communication is a technology in which a base station (AP) communicates with a plurality of terminals (STAs) by multiplexing signals spatially or in frequency. Furthermore, the DSC is a technology for newly obtaining a communication opportunity by changing a threshold value for packet detection of a conservatively set wireless LAN. In the SR communication based on a DSC operation, when received power of a signal received from another basic service set (BSS) is equal to or smaller than a predetermined signal detection threshold value, backoff is permitted to increase the transmission opportunity in the BSS.

CITATION LIST

Patent Document

Patent Document 1: Japanese Patent Application Laid-Open No. 2016-129406

SUMMARY OF THE INVENTION

Problems to be Solved by the Invention

An object of the technology disclosed in the present specification is to provide a communication device and a communication method for realizing high-speed communication by multi user communication or spatial reuse technology.

Solutions to Problems

The first aspect of the technology disclosed in the present specification is a communication device that operates as a base station, the communication device including:

a determination unit configured to determine a communication status in a BSS of the communication device; and a control unit configured to control transmission and reception of a signal regarding connection change of a terminal to and from a surrounding base station according to a determination result by the determination unit.

The determination unit determines the presence of a small number of terminals falling outside a distribution of implementation statuses of spatial reuse communication or multi user communication of entire subordinate terminals, and the control unit controls transmission of a request signal requesting the small number of terminals to be connected to the surrounding base station. Alternatively, the control unit controls transmission of the inquiry signal inquiring of the surrounding base station availability of acceptance of the small number of terminals.

Furthermore, the control unit sets a communication parameter of a control unit's own base station on the basis of information regarding a communication resource set for the surrounding base station by the surrounding base station or information regarding a communication resource allowed to the control unit's own base station by the surrounding base station, the information being received from either the terminal or the surrounding base station when the control unit connects a subordinate terminal of the surrounding base station to the control unit's own base station.

Furthermore, the control unit controls, in response to reception of an inquiry signal inquiring availability of acceptance of a subordinate terminal of a surrounding base station from the surrounding base station, transmission of an answer signal answering the availability of acceptance of a subordinate terminal of the surrounding base station.

Furthermore, the second aspect of the technology disclosed in the present specification is a communication method for operating as a base station, the communication method including:

a determination step of determining a communication status in a BSS of the base station; and a control step of controlling transmission and reception of a signal regarding connection change of a terminal to and from a surrounding base station according to a determination result by the determination step.

Furthermore, the third aspect of the technology disclosed in the present specification is a communication device that operates as a terminal under control of a base station, the communication device including:

a transmission and reception unit configured to transmit and receive a signal; and a control unit configured to control connection with a base station on the basis of a request signal requesting connection to another base station received from a connection destination base station.

The control unit controls transmission of information to the another base station after the connection is established, the information described in the request signal and being regarding a communication resource set to an original connection destination base station after connection is changed to the another base station or being regarding a communication resource allowed to the another base station.

Furthermore, the fourth aspect of the technology disclosed in the present specification is a communication method for operating as a terminal under control of a base station, the communication method including:

a reception step of receiving a request signal requesting connection to another base station received from a connection destination base station; and a control step of controlling connection with a base station on the basis of the request signal.

Effects of the Invention

According to the technology disclosed in the present specification, a communication device and a communication method for realizing high-speed communication by multi user communication or spatial reuse technology can be provided.

Note that the effects described in the present specification are merely examples, and the effects of the present invention are not limited thereto. Furthermore, the present invention may further exhibit additional effects in addition to the above effects.

Still other objects, features, and advantages of the technology disclosed in the present specification will become clear from detailed description based on embodiments described later and attached drawings.

MODE FOR CARRYING OUT THE INVENTION

Figure 1:
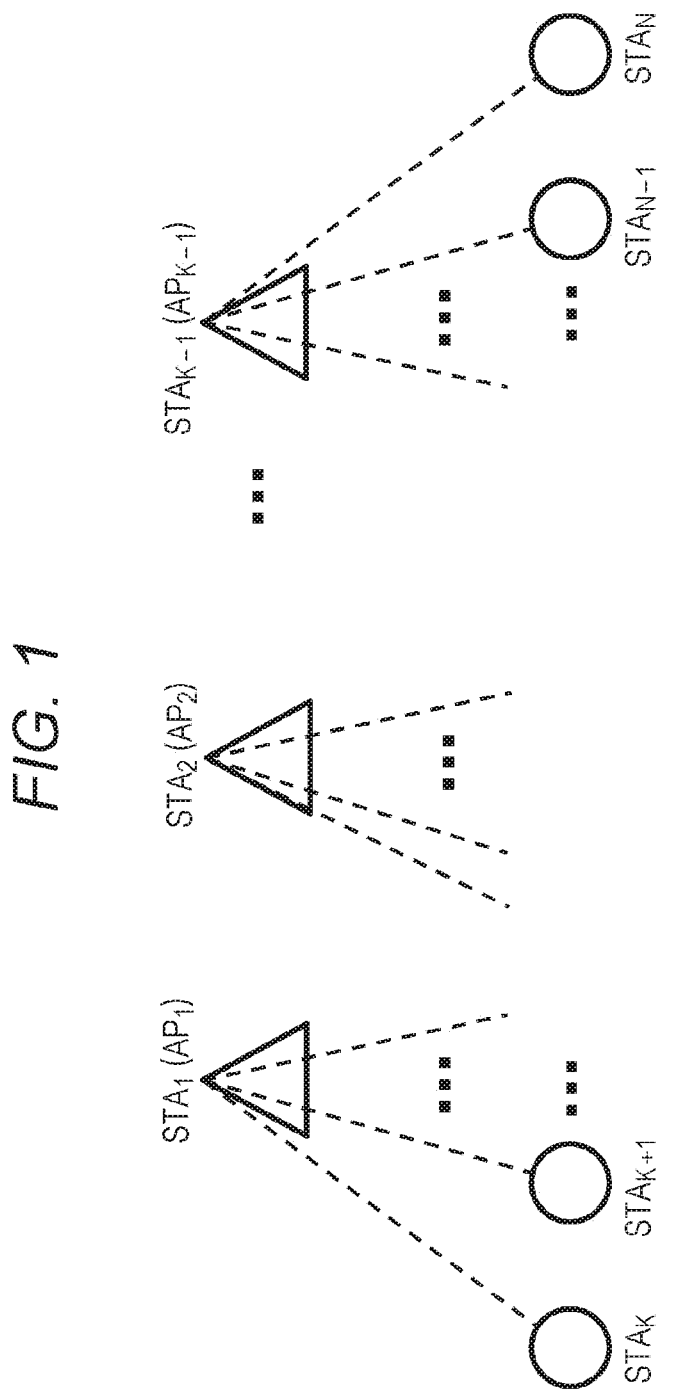
FIG. 1 is a diagram illustrating a configuration example of a wireless communication system to which the technology disclosed in the present specification is applicable.

Hereinafter, embodiments of the technology disclosed in the present specification will be described in detail with reference to the drawings.

If a small number of STAs with low communication quality or a small number of STAs incapable of performing UL MU communication or SR communication based on a DSC operation cannot is present in a BSS, a problem arises, in which improvement effects in the SR communication and the UL MU communication cannot be sufficiently obtained.

First, a problem in the UL MU communication will be described. In the UL MU communication, received power of signals transmitted from the respective STAs need to be the same to some extent. For this reason, in a case where a small number of STAs (hereinafter also referred to as "weak link STAs") having smaller received power due to a propagation loss or the like is present, if the weak link STA is selected as an STA for performing the UL MU communication, other STAs that perform the UL MU communication needs to perform transmission with low transmission power in accordance with the weak link STA. As a result, a signal-to-noise power ratio decreases, and the possibility that an AP cannot correctly receive a packet increases. If the weak link STA is not selected as the STA for MU communication, an opportunity for the weak link STA to perform single user (SU) communication needs to be additionally secured in order to secure throughput of the weak link STA. Since the weak link STA has poor communication quality, communication is performed with MCS (encoding/modulation method) with a low data rate. For this reason, since the frequency resource is occupied for a long time for the SU communication of the weak link STA, the time to perform the MU communication is relatively reduced. Even in a case where an STA that rarely performs or cannot perform the UL MU communication is present due to set parameters or implementation reasons, the opportunity to perform the SU communication similarly needs to be secured and thus the time to perform the MU communication is relatively reduced.

Meanwhile, in a case where a weak link STA is present in the SR communication, if the signal detection threshold value of the wireless LAN packet is increased, the packet transmitted by the weak link STA cannot be detected, which is a great restriction on the SR communication. As a result, the effect of increasing communication opportunities by the SR communication cannot be obtained. Furthermore, in a case where an STA that performs the SR communication opportunity and an STA that rarely performs or cannot perform the SR communication are present in the same BSS, unfair communication opportunities occur. For example, in a case where an interference signal larger than the signal detection threshold value arrives at the STA that performs the SR communication and the STA that rarely performs or cannot perform the SR communication from another BSS, the STA that rarely performs or cannot perform the SR communication becomes a busy state but the STA that performs the SR communication has a possibility of performing communication by increasing the signal detection threshold value. As a result, only the STA that can perform the SR communication performs the communication, and the communication opportunities become more unfair.

In addition, the STA cannot grasp whether or not the STA itself is a restriction on the SR communication or MU communication operation in the BSS. For this reason, when viewed from the entire BSS, even in a case where the STA can improve the throughput of the BSS and its own throughput by being connected to another connectable BSS, the STA itself cannot make the determination.

For example, a wireless communication method that can start association when an AP is a wireless transmission and reception unit has been proposed (see, for example, Patent Document 1). According to this wireless communication method, the AP transmits a signal for requesting connection to another AP connected by a backhaul to a subordinate STA on the basis of an AP's own traffic load. In response to this request, the STA performs association with the another appropriate AP. In this wireless communication method, an association request to the STA is transmitted using the traffic load as a determination criterion. In other words, this method does not determine how the STA should be associated on the basis of the efficiency of the SR transmission and the UL MU communication. Furthermore, the wireless communication method is based on the assumption that APs are connected by a backhaul. In the wireless LAN network, basically, connection of APs by a backhaul is not assumed. That is, this wireless communication method can be applied only in a very limited wireless environment such as an Enterprise WLAN.

In a mobile communication network, a mobile communication base station (BS) determines whether or not to handoff to another BS on the basis of received power of a mobile communication terminal (MT). In the mobile communication network, BSs are connected by a backhaul and managed by a common centralized control station. In contrast, in the wireless LAN network, each AP autonomously operates in a decentralized manner, and if a connection destination of an STA is simply controlled using the received power as a determination criterion, there is a risk of falling into a situation where the AP unilaterally suffers a loss such as an increase in a traffic load of a certain AP, which causes a problem as an operation.

Therefore, the present specification proposes a technology of an AP optimizing a connection destination of an STA on the basis of a distribution of implementation statuses of SR communication and UL MU communication of subordinate STAs. The AP investigates the distribution of implementation statuses of SR communication and UL MU communication of each subordinate STA, and performs operation and selection on the basis of a result of the investigation.

Specifically, as a result of the AP investigating an implementation status of the SR communication and the UL MU communication of each subordinate STA, in a case where the presence of a small number of STAs (hereinafter also referred to as "isolated STAs") falling outside a distribution of the entire STAs is revealed, the AP requests such an isolated STA to transmit a report of information regarding APs to which the STA itself is connectable. In many cases, the isolated STA is a weak link STA with smaller received power due to a propagation loss or the like than other STAs in the same BSS. Then, in a case where another AP to which the isolated STA is connectable is present, and the isolated STA is determined to be connected to the another connectable AP, the AP requests the isolated STA to be connected to the another connectable AP, and transmits a signal including information prompting resetting of parameters so that the isolated STA can easily obtain a transmission opportunity when being connected to the another connectable AP. After that, the isolated STA transmits a signal including information prompting the newly connected AP to reset parameters notified from the previous connection destination AP.

Meanwhile, in a case where an AP to which the isolated STA is connectable is not present, the AP notifies a surrounding AP capable of cooperative operation that the AP can accept the isolated STA. Through this operation, the APs can effectively mutually accept the respective subordinate isolated STAs. Furthermore, the AP can receive preferential treatment of setting parameters (for example, allowed to set superior contention window size, arbitration inter frame space (AIFS), and signal detection value) as a reward by accepting an isolated STA connected to another BSS even in a case where the subordinate isolated STA of the AP cannot be accepted by another BSS.

Through the operation of the APs, the throughput of the entire network can be improved. Furthermore, the isolated STA side may be able to improve its own throughput by being connected to another AP from the state where the communication quality is low or the UL MU communication or SR communication is not available. Furthermore, the operation between APs can be realized between BSSs not connected by a backhaul.

FIG. 1 schematically illustrates a configuration example of a wireless communication system to which the technology disclosed in the present specification is applicable. The illustrated system includes a plurality of wireless devices $STA_1$, $STA_2$, ..., $STA_{K-1}$, $STA_K$, ..., $STA_{N-1}$, and $STA_N$. Among the plurality of wireless devices, $STA_0$, $STA_1$, ..., and $STA_{K-1}$ are base stations (AP), and $STA_K$, ..., $STA_{N-1}$, and $STA_N$ are slave units or terminals (STA). Note that the number of base stations and the number of terminals are not limited to specific numbers in implementing the technology disclosed in the present specification.

Figure 2:
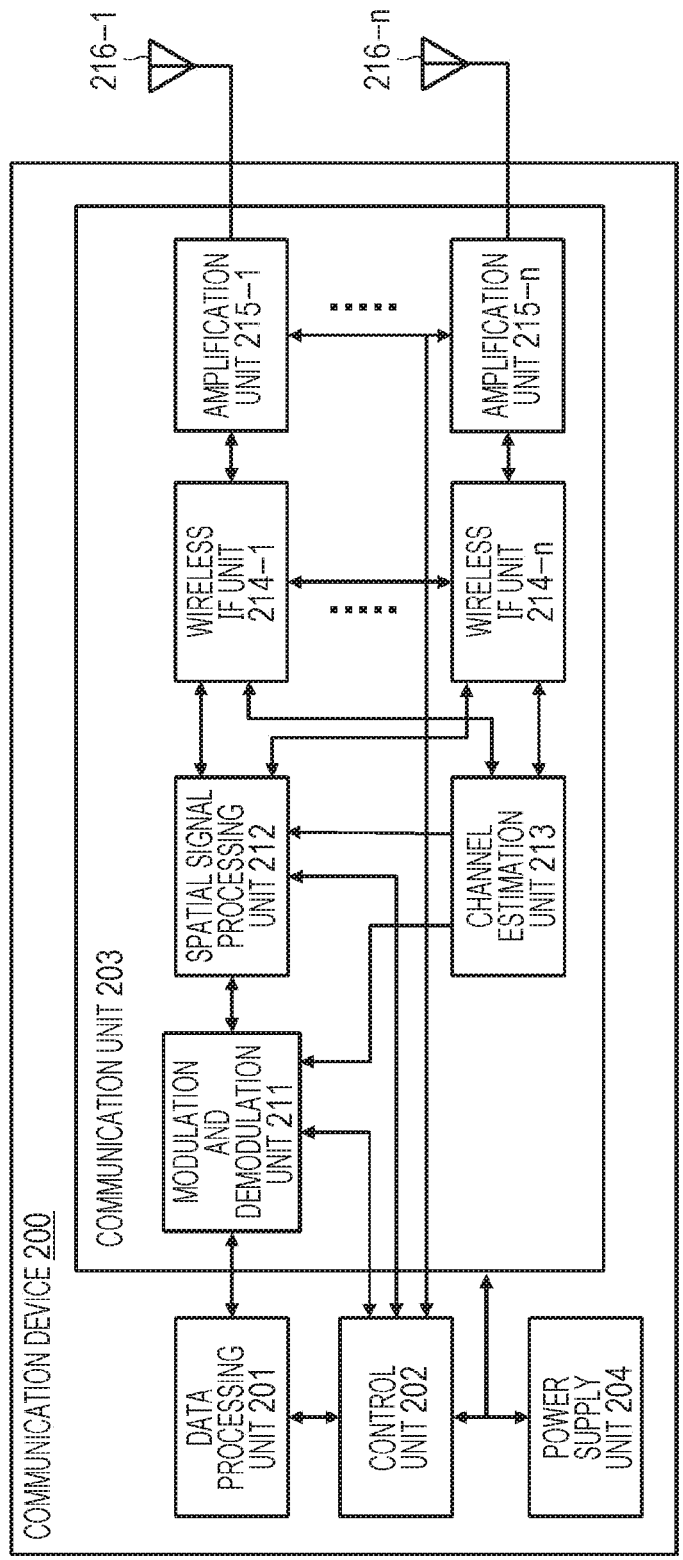
FIG. 2 is a diagram illustrating a functional configuration of a communication device 200 to which the technology disclosed in the present specification is applicable.

FIG. 2 schematically illustrates a functional configuration of a communication device 200 to which the technology disclosed in the present specification is applicable. The illustrated communication device 200 can operate as both the AP and the STA in the wireless communication system illustrated in FIG. 1, for example.

The communication device 200 includes a data processing unit 201, a control unit 202, a communication unit 203, and a power supply unit 204. Furthermore, the communication unit 203 further includes a modulation and demodulation unit 211, a signal processing unit 212, a channel estimation unit 213, a wireless interface (IF) unit 214, an amplification unit 215, and an antenna 216. Note that the wireless interface unit 214, the amplification unit 215, and the antenna 216 may form one set, and one or more sets may be constituent elements. Furthermore, the function of the amplification unit 215 may be included in the wireless interface unit 214. Furthermore, the antenna 216 may be externally connected to a main body of the communication device 200, besides being provided as a constituent element of the communication device 200.

At a transmission time to input data from a protocol upper layer (not illustrated), the data processing unit 201 generates a packet for wireless transmission from the data, performs processing such as adding a header and an error detection code for media access control (MAC), and provides the processed data to the modulation and demodulation unit 211 in the communication unit 203. Conversely, at a reception time to receive an input from the modulation and demodulation unit 211, the data processing unit 201 performs MAC header analysis, packet error detection, reorder processing, and the like, and provides the processed data to the upper layer of the data processing unit 201's own protocol.

The control unit 202 controls exchange of information among the units in the communication device 200. Furthermore, the control unit 202 performs parameter setting in the modulation unit 211 and the signal processing unit 212, and performs scheduling of the packet in the data processing unit 201. Furthermore, the control unit 202 performs parameter setting and transmission power control of the wireless interface unit 214 and the amplification unit 215.

In particular, when the communication device 200 operates as an AP and implements the technology disclosed in the present specification, the control unit 202 controls each unit to realize processing of investigating a distribution of an implementation statuses of SR communication and UL MU communication of subordinate wireless terminals, and specifying a wireless terminal (for example, an isolated STA in a BSS) that is better to change connection to another base station. Furthermore, the control unit 202 controls the isolated STA to transmit a signal including information requesting connection to another AP and information prompting resetting of parameters so as to easily obtain a communication opportunity for transmission when being connected to the appropriate base station. Alternatively, the control unit 202 performs control to transmit a signal enabling a subordinate STA of another AP to be easily connected to the control unit 202 itself (for example, signal including information of a communication parameter serving as a reward) to a surrounding AP.

The modulation and demodulation unit 211 encodes, interleaves, and modulates input data from the data processing unit 201 on the basis of coding and modulation method set by the control unit 202, generates a data symbol stream, and provides the data symbol stream to the signal processing unit 212, at the time of signal transmission. Furthermore, at the time of signal reception, the modulation and demodulation unit 211 performs reverse processing to the processing at the time of transmission for an input from the signal processing unit 212, and provides received data to the data processing unit 201 or the control unit 202.

At the time of signal transmission, the signal processing unit 212 performs signal processing to be provided for spatial separation, for an input from the modulation and demodulation unit 211 as needed, and provides obtained one or more transmission symbol streams to the respective wireless interface units 214. Furthermore, at the time of signal reception, the signal processing unit 212 performs signal processing for the received symbol streams input from the respective wireless interface units 214, performs spatial decomposition of the streams as needed, and provides the streams to the modulation and demodulation unit 211.

The channel estimation unit 213 calculates complex channel gain information of a propagation path from a preamble portion and a training signal portion of input signals from the respective wireless interface units 214. The calculated complex channel gain information is used for demodulation processing in the modulation and demodulation unit 211 and spatial processing in the signal processing unit via the control unit 202.

At the time of signal transmission, the wireless interface unit 214 converts the input from the signal processing unit into an analog signal, performs filtering and up-conversion to a carrier frequency, and sends the signal to the antenna 216 or the amplification unit 215. Furthermore, at the time of signal reception, the wireless interface unit 214 performs reverse processing for the input from the antenna 216 or the amplification unit 215, and provides data to the signal processing unit 212 and the channel estimation unit 213.

At the time of signal transmission, the amplification unit 215 amplifies the analog signal input from the wireless interface unit 214 to predetermined power and sends the signal to the antenna 216. Furthermore, at the time of signal reception, the amplification unit 215 amplifies the signal input from the antenna 216 to predetermined power with low noise, and outputs the signal to the wireless interface unit 214. At least either the function at the time of transmission or the function at the time of reception of the amplification unit 215 is sometimes included in the wireless interface unit 214.

The power supply unit 204 is configured by a battery power source or a fixed power source, and supplies power to each unit in the communication device 200.

The technology disclosed in the present specification is that an AP optimizes a connection destination of an STA on the basis of a distribution of implementation statuses of SR communication or UL MU communication of subordinate STAs. Hereinafter, two examples of the technology disclosed in the present specification will be introduced.

In Example 1, an AP investigates implementation statuses of SR communication and UL MU communication of each subordinate STA. As a result of the investigation, in a case where the presence of a small number of isolated STAs falling outside a distribution of the entire subordinate STAs has been revealed, the AP selects either one of following two operations (a) and (b), and executes the selected operation.

(a) The AP requests an isolated STA to be connected to specified another AP, and transmits a request signal including information prompting resetting of parameters so as to easily obtain a communication opportunity for transmission when the isolated STA is connected to the specified AP.

(b) In a case where the AP can accommodate an isolated STA connected to a surrounding AP, the AP notifies the surrounding AP that the AP can accept the isolated STA.

The isolated STA is connected to the specified another AP from the AP in connection. Then, when connected to the specified AP, the isolated STA transmits, to the newly connected AP, the signal including information prompting resetting of parameters sent from the previously connected AP.

Furthermore, the AP to which the isolated STA has been newly connected changes an AP's own transmission parameter according to parameter information included in the signal received from the isolated STA.

Furthermore, in Example 2, in a case where an isolated STA meeting conditions is present under the control of an AP, the AP selects either one of the following operations (c) and (d), and executes the selected operation.

(c) The AP transmits an inquiry signal inquiring whether or not the isolated STA can be connected to an AP to which the subordinate isolated STA is connectable. Then, in a case where permission is given by the connectable AP, the AP transmits, to the isolated STA, a request signal including information requesting the isolated STA to be connected to the connectable AP and information prompting resetting of parameters so as to easily obtain a communication opportunity for transmission when being connected to the connectable AP. When the isolated STA is connected to the connectable AP, the isolated STA transmits, to the new connection destination AP, the signal including information prompting resetting of parameters sent from the previously connected AP.

(d) In a case where the AP can accommodate an isolated STA connected to a surrounding AP, the AP notifies the surrounding AP that the AP can accept the isolated STA.

When the AP receives a signal confirming whether or not to connect an STA from another AP, the AP returns a signal indicating availability of connection.

The isolated STA is connected to another AP specified in the request signal received from the connection destination AP.

Example 1

Figure 3:
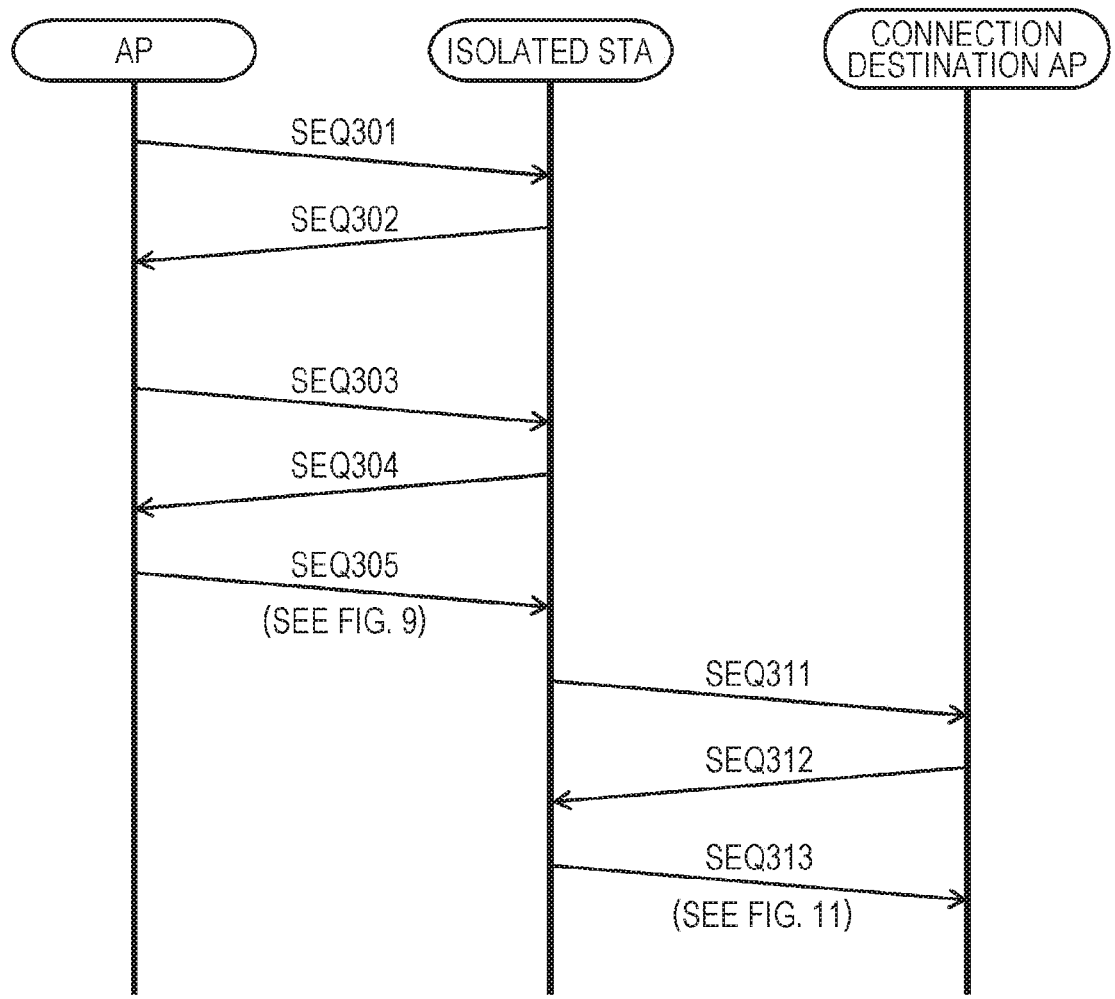
FIG. 3 is a diagram illustrating a sequence example of communication according to Example 1.

FIG. 3 illustrates a communication sequence example performed among an AP, a subordinate isolated STA of the AP, and a new connection destination AP of the isolated STA in Example 1. The illustrated communication sequence assumes that the isolated STA is connectable to another AP (the connection destination AP in FIG. 3).

The AP requests the subordinate STA to transmit information regarding communication quality and information regarding an implementation status of SR communication and UL MU communication (SEQ301). In response to the request, the STA returns the requested information to the AP (SEQ302). Although omitted in FIG. 3, the AP requests other subordinate STAs to transmit similar information, and each STA returns the requested information to the AP. Then, as a result of the AP investigating the implementation statuses of SR communication and UL MU communication of each subordinate STA, the presence of an isolated STA falling outside a distribution of the entire subordinate STAs is revealed.

The AP requests the isolated STA to transmit information regarding other connectable APs (SEQ303). In response to the request, the isolated STA returns the information regarding other connectable APs to the AP (SEQ304). Here, the information regarding other connectable APs returned by the isolated STA may include identification information such as service set identifiers (SSID) of the connectable APs, the magnitude of received power, a signal-to-noise power ratio, the implementation status of SR communication or UL MU communication, and the like. Then, the AP determines whether or not to change the connection of the isolated STA to another AP on the basis of the information returned by the isolated STA and the like.

Next, the AP requests the subordinate isolated STA to be connected to a specified another AP, and transmits a request signal including parameter information set for the another AP (SEQ305). This parameter information is set as a reward for the another AP for accepting the isolated STA. The AP determines a value of the parameter information with which the another AP can more easily obtain a communication opportunity according to the degree of wishing the another AP to accept the subordinate isolated STA, for example.

The isolated STA requests connection to the new connection destination AP specified by the request signal (SEQ311). The another AP that has received the connection request from the isolated STA determines whether or not to accept the isolated STA on the basis of information of an AP's own traffic load and the like. Then, when receiving a reply indicating that the isolated STA is connectable from the AP (SEQ312), the isolated STA transmits a signal including the parameter information sent from the previously connected AP to the AP that will be a new connection destination (SEQ313). In response, the AP to which the isolated STA has been newly connected changes the AP's own transmission parameter according to the parameter information included in the signal received from the isolated STA. The parameter information received from the isolated STA is set as a reward for accepting the isolated STA. The new connection destination AP is allowed to set the parameter information in return for accepting the isolated STA and is expected to more easily obtain a communication opportunity.

Note that, in a case where a plurality of isolated STAs to be determined is present, a sequence similar to the above-described sequence is performed for each of the individual isolated STAs.

Figure 4:
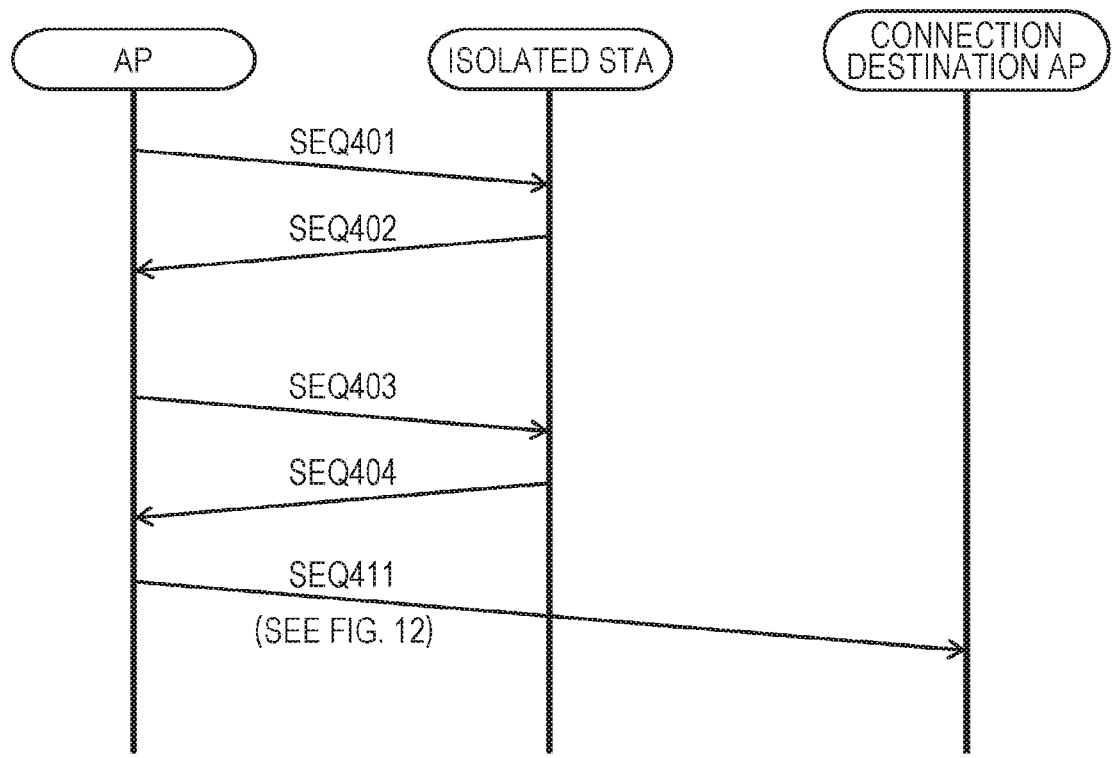
FIG. 4 is a diagram illustrating another sequence example of the communication according to Example 1.

FIG. 4 illustrates another communication sequence example performed among the AP, the subordinate isolated STA of the AP, and the connection destination AP in Example 1. The illustrated communication sequence assumes that the isolated STA cannot be connected to another AP (the connection destination AP in FIG. 4) and an isolated STA of the another AP is acceptable.

The AP requests the subordinate STA to transmit the information regarding communication quality and the information regarding an implementation status of SR communication and UL MU communication (SEQ401). In response to the request, the STA returns the requested information to the AP (SEQ402). Although omitted in FIG. 4, the AP requests other subordinate STAs to transmit similar information, and each STA returns the requested information to the AP. Then, as a result of the AP investigating the implementation statuses of SR communication and UL MU communication of each subordinate STA, the presence of an isolated STA falling outside a distribution of the entire subordinate STAs is revealed.

The AP requests the isolated STA to transmit the information regarding other connectable APs (SEQ403). In response to the request, the isolated STA returns the information regarding other connectable APs to the AP (SEQ404). The information regarding other connectable APs returned by the isolated STA may include the identification information such as SSIDs of the connectable APs, the magnitude of received power, a signal-to-noise power ratio, the implementation status of SR communication or UL MU communication, and the like (the same as above). Then, the AP determines whether or not to change the connection of the isolated STA to another AP.

In a case where the AP determines that the subordinate isolated STA is not connectable to another AP, the AP gives up delivery of the isolated STA to the another AP. Furthermore, in a case where the AP can accommodate an isolated STA connected to another AP, the AP notifies the surrounding AP that the AP can accept the isolated STA (SEQ411). The AP is expected to receive preferential treatment of setting parameters (for example, a contention window size, an arbitration inter frame space (AIFS), a signal detection value, and the like) as a reward from the surrounding AP by accepting the isolated STA of another BSS even in a case where the subordinate isolated STA cannot be accepted by the surrounding AP.

Note that, in a case where a plurality of isolated STAs to be determined is present, a sequence similar to the above-described sequence is performed for each of the individual isolated STAs.

The AP periodically collects information regarding implementation statuses of SR communication and UL MU communication from each subordinate STA. The information regarding implementation statuses of SR communication and UL MU communication is any one of or a combination of a plurality of pieces of information including the number of times to perform SR transmission and MU communication within a fixed period, a success probability of the SR transmission and MU communication, capability of the SR transmission and MU communication, information indicating whether or not functions of the SR transmission and MU communication are activated, current transmission power, a signal-to-interference plus noise power ratio (SINR), and a received signal strength indicator (RSSI).

The AP may collect these pieces of information via a communication quality report signal from the subordinate STA or the AP itself may measure the information using the signal transmitted from the subordinate STA. The AP holds the information as parameter information of each subordinate STA. An example of the parameters held by the AP is shown in Table 1 below.

TABLE 1

| Parameter | $STA_k$ | $STA_{k+1}$ | ... |
|---|---|---|---|
| The number of implementation times of SR transmission | xx | yy | ... |
| Success probability of SR transmission | xx % | yy % | ... |
| capability of SR transmission | 1 | 1 | ... |
| activate of SR transmission function | 0 | 1 | ... |
| . | . | . | |
| . | . | . | |
| . | . | . | |
| The number of implementation times of UL MU transmission | xx | yy | ... |
| Success probability of UL MU transmission | xx % | yy % | ... |
| capability of UL MU transmission | 1 | 1 | ... |
| activate of UL MU transmission function | 1 | 1 | ... |
| . | . | . | |
| . | . | . | |
| . | . | . | |
| Transmission power | −xx dB | −yy dB | ... |
| SINR | −xx dB | −yy dB | ... |
| RSSI | xxx dBm | yyy dBm | ... |
| . | . | . | |
| . | . | . | |
| . | . | . | |

Then, the AP determines whether or not an isolated STA is present in the subordinate STAs on the basis of the held parameters. The isolated STA referred here is an STA having a parameter value separated from other STAs when the parameter information regarding the implementation status of the SR communication or the UL MU communication is compared among the STAs. The AP determines a combination of a plurality of pieces of parameter information for determining the AP's own operation by seeing a distribution of the parameter values of the implementation statuses of the SR communication or the UL MU communication.

The AP refers, for example, to the distribution of the parameter information regarding the implementation statuses of the SR communication and the UL MU communication held by the AP itself, and determines an STA having parameter information falling outside the distribution as the isolated STA. Here, the AP may refer to one type or a plurality of types of the held parameter information. In a mobile communication network, whether or not to perform handover is simply determined using communication quality as a criterion. In contrast, in the present example, an STA to change the connection destination is selected from the viewpoint of how to obtain the effect by performing the SR communication and the UL MU communication in the entire network.

Figure 5:
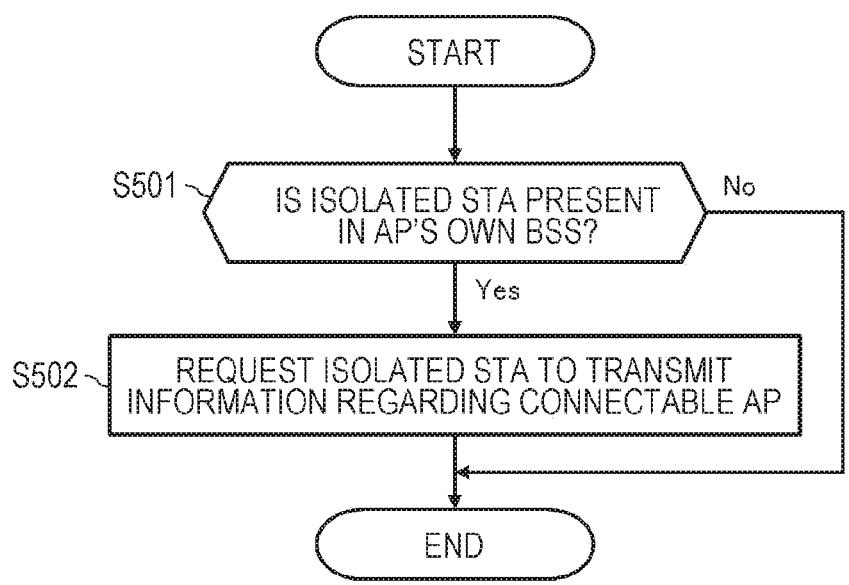
FIG. 5 is a flowchart illustrating a processing procedure performed by an APAP for a subordinate isolated STA.

FIG. 5 illustrates a processing procedure performed by the AP for the subordinate isolated STA in the form of flowchart.

The AP determines whether or not the isolated STA is present in the subordinate STAs (step S501). This determination may be performed at fixed intervals using a timer held by the AP or may be performed when the AP starts the MU or SR communication. As described above, the parameter information regarding the implementation status of the SR communication or the UL MU communication is compared among the STAs, and an STA having a separate parameter value is determined as the isolated STA.

Then, in a case where the AP determines that the isolated STA is present in the subordinate STAs (Yes in step S501), the AP transmits the signal requesting transmission of the information regarding connectable APs to the isolated STA (step S502).

Here, the destination of the request signal requesting transmission of the information regarding connectable APs may be an individual isolated STA or may be a plurality of isolated STAs. Furthermore, the isolated STA may allow the return to the request from the AP to include, as the information regarding other connectable APs, the identification information such as SSIDs of the connectable APs, the magnitude of received power, a signal-to-noise power ratio, the implementation status of the SR communication or the UL MU communication, and the like (the same as above).

Then, when receiving the information regarding connectable APs from the subordinate isolated STA, the AP determines whether or not to connect the isolated STA to another AP.

Figure 6:
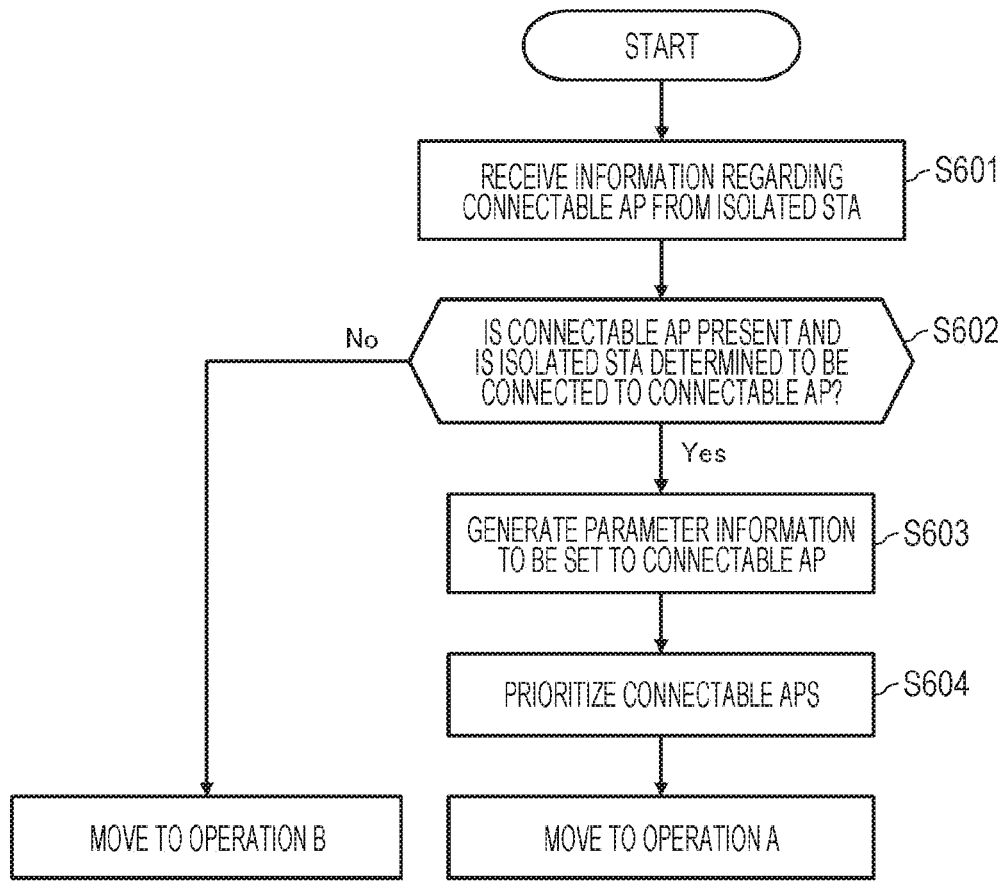
FIG. 6 is a flowchart illustrating a processing procedure for determining whether or not an AP connects a subordinate isolated STA to another AP.

FIG. 6 illustrates a processing procedure for determining whether or not the AP connects the subordinate isolated STA to another AP in the form of flowchart.

When receiving the information regarding other connectable APs from the subordinate isolated STA (step S601), the AP determines whether or not an AP to which the isolated STA is connectable is present and whether or not to connect the isolated STA to the connectable AP (step S602).

In a case where another AP to which the subordinate isolated STA is connectable is present in step S602, the AP determines whether or not to connect the STA to another connectable AP on the basis of any one of or a combination of the information regarding connectable APs received from the isolated STA, whether or not an AP to which another isolated STA is connectable is present, information regarding implementation status of the SR communication or the UL MU communication in the connectable AP, and the number of isolated STAs with respect to the entire subordinate STAs.

In a case where the AP determines to connect the subordinate isolated STA to another connectable AP (Yes in step S602), the AP generates parameter information set as a reward for the connectable AP for the acceptance of connection of the isolated STA (step S603).

The parameter information set as a reward for the connectable AP is, for example, one of or a combination of a contention windows (CW) size, an arbitration inter frame space (AIFS), a transmission opportunity (TXOP), and a signal detection threshold value. The AP may determine a value of the parameter information with which the another AP can more easily obtain a communication opportunity according to the degree of wishing the another AP to accept the subordinate isolated STA. For example, in a case where the communication quality of the isolated STA in the AP's own BSS is extremely low, and efficient implementation of the SR communication and the UL MU communication in the AP's own BSS is expected by release of the isolated STA, the AP may set superior parameter information to another AP that is wished to accept the isolated STA.

Furthermore, in a case where a plurality of APs to which the isolated STA is connectable is present, the AP prioritizes the plurality of connectable APs and holds the priorities regarding the APs to which the isolated STA is connectable (step S604)

All of APs have a list of APs (hereinafter also referred to as "accepting APs") notifying surrounding APs that the APs can accept STAs. A specific definition of the accepting AP will be described later. For example, the AP refers to the AP's own accepting AP list, and confirms whether or not an accepting AP is present in the APs to which the subordinate isolated STA is connectable. Here, in a case where an accepting AP is present in the APs to which the isolated STA is connectable, the AP sets the priority of the accepting AP to be high in step S604. The priorities between accepting APs and between APs not accepting APs are determined on the basis of a result of comparing the information of implementation statuses of each of the SR communication and the UL MU communication.

Then, when the prioritization in step S604 is completed, the AP moves onto the operation A. Meanwhile, in a case where another connectable AP to which the subordinate isolated STA is connectable is not present or in a case where the AP determines not to connect the subordinate isolated STA to another connectable AP (No in step S602), the AP moves onto the operation B.

Figure 7:
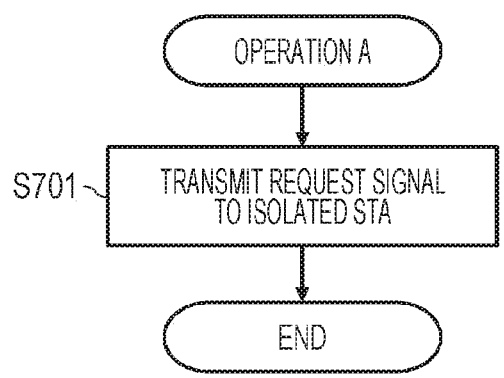
FIG. 7 is a flowchart illustrating a processing procedure of an operation A performed by an AP when the AP connects a subordinate isolated STA to another AP.

FIG. 7 illustrates a processing procedure of the above operation A performed by the AP when the AP connects the subordinate isolated STA to another AP in the form of flowchart.

In the operation A, the AP requests the subordinate isolated STA to be connected to the another connectable AP, and transmits the request signal including information of parameter setting to the another AP (step S701). For example, the AP transmits the request signal including the parameter information set as a reward for the another AP for accepting the AP's own isolated STA.

Figure 9:
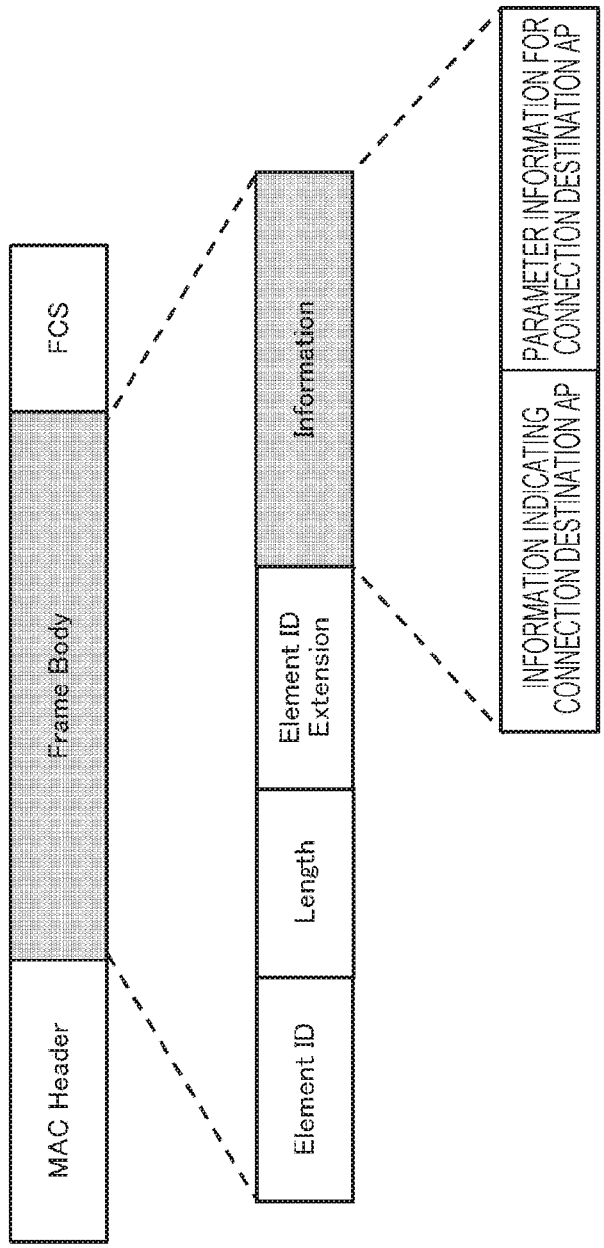
FIG. 9 is a diagram illustrating a frame configuration of a signal transmitted by an AP to a subordinate isolated STA when the AP requests the subordinate isolated STA to be connected to another AP.

FIG. 9 illustrates a frame configuration of the request signal requesting connection to another AP, which is transmitted by the AP to the subordinate isolated STA in step S701 in the flowchart illustrated in FIG. 7 and in the SEQ305 in the communication sequence illustrated in FIG. 3. In a case where a plurality of APs to which the isolated STA is connectable is present, the AP may transmit the request signal to only APs having a high priority, or may notify the APs to which the isolated STA is connectable and transmit the request signal requesting connection according to a priority order.

The frame illustrated in FIG. 9 includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, in the information part (Information) of the frame body, information indicating another AP to which the subordinate isolated STA is requested to connect (in other words, information indicating a connection destination AP) and parameter information set for the connection destination AP (in other words, parameter information for the connection destination AP) are stored.

The information indicating a connection destination AP may include either one of or both of an SSID and BSS color of the connection destination AP (the SSID is an identification name of the AP in a wireless LAN, and the BSS Color is different color information for each BSS introduced by IEEE802.11ah).

Furthermore, the parameter information for the connection destination AP is parameter information generated for the isolated STA determined by the AP to change connection to another AP in step S603 of the flowchart illustrated in FIG. 6. The AP generates the parameter information set as a reward for the another AP for accepting the AP's own isolated STA. The AP determines a value of the parameter information with which the another AP can more easily obtain a communication opportunity according to the degree of wishing the another AP to accept the subordinate isolated STA, for example.

Figure 10:
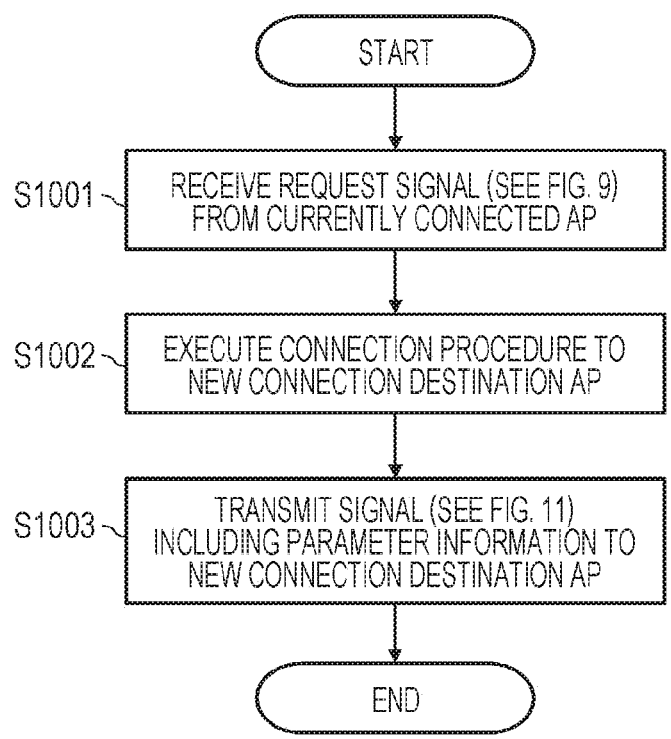
FIG. 10 is a flowchart illustrating a processing procedure performed when an isolated STA has received a signal requesting connection to another AP.

FIG. 10 illustrates a processing procedure performed when the isolated STA has received the request signal requesting connection to another AP.

When receiving the request signal requesting connection to another connectable AP (see FIG. 9) from the currently connected AP (step S1001), the isolated STA executes a connection procedure to the another AP indicated in the received request signal as the new connection destination (step S1002).

Then, when the connection to the another AP requested to connect to is established, the isolated STA transmits a signal including the parameter information described in the request signal received in step S1001 to the new connection destination AP (step S1003).

Figure 11:
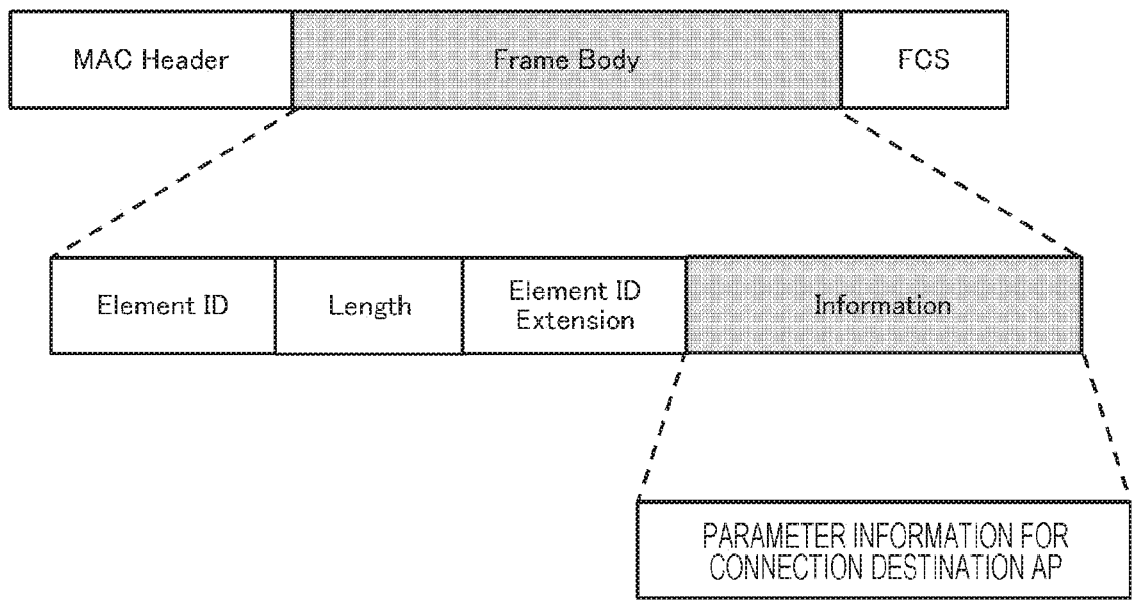
FIG. 11 is a diagram illustrating a frame configuration of a signal transmitted by an isolated STA to a new connection destination AP.

FIG. 11 illustrates a frame configuration of the signal transmitted by the isolated STA to the new connection destination AP in step S1003 in the flowchart in FIG. 10 and in SEQ313 in the communication sequence in FIG. 3. The illustrated frame includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, in the information part (Information) of the frame body, information of parameter setting to the (new connection destination) AP is included.

This parameter information is parameter information generated when the original connection destination AP determines to change connection to another AP in step S603 in the flowchart illustrated in FIG. 6. The original connection destination AP generates the parameter information set as a reward for the another AP for accepting the isolated STA. For example, the original connection destination AP determines a value of the parameter information with which the another AP can more easily obtain a communication opportunity according to the degree of wishing the another AP to accept the subordinate isolated STA (described above). The new connection destination AP may update the AP's own parameters on the basis of the parameter information described in the signal received from the newly connected STA.

Figure 8:
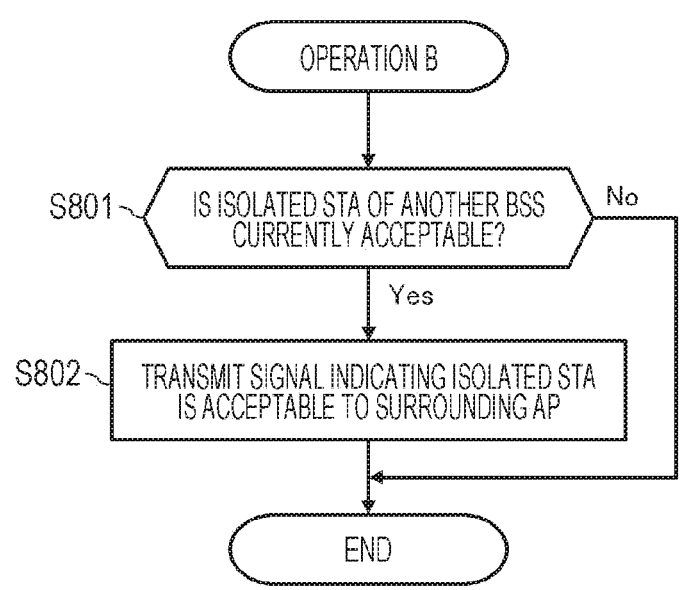
FIG. 8 is a flowchart illustrating a processing procedure of an operation B performed by an AP when the AP does not connect a subordinate isolated STA to another AP.

Furthermore, FIG. 8 illustrates a processing procedure of the above "operation B", which is performed by the AP when another AP to which the subordinate isolated STA is connectable is not present or the subordinate isolated STA cannot be connected to another AP, in the form of flowchart.

In the operation B, the AP determines whether or not the AP itself can currently accept an isolated STA of another BSS (step S801). Then, in a case where the AP can accept the isolated STA of another BSS (Yes in step S801), the AP notifies the surrounding APs of a signal indicating that the AP can accept the isolated STA. On the other hand, in a case where the AP cannot accept the isolated STA of another BSS (No in step S801), the AP terminates the processing without doing anything.

Figure 12:
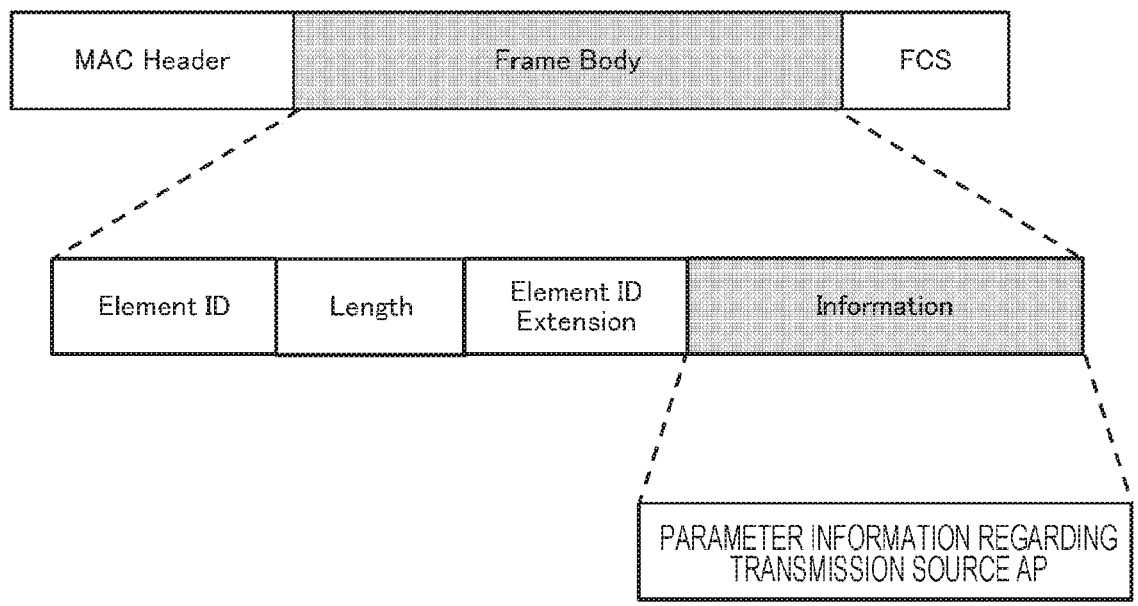
FIG. 12 is a diagram illustrating a frame configuration of a signal notifying a surrounding AP that an AP can accept an isolated STA.

FIG. 12 illustrates a frame configuration of the signal notifying the surrounding AP that the AP can accept the isolated STA in step S802 in the flowchart in FIG. 8 and SEQ411 in the communication sequence in FIG. 4. The illustrated frame includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, in the information part (Information) of the frame body, information regarding the AP itself that is the transmission source of the frame is included.

The information regarding the AP itself may include any one of or a combination of the implementation status of the SR information or the UL MU communication, information regarding interference, and a traffic load of the AP. The surrounding AP can determine whether or not the transmission source AP can accept the isolated STA in the surrounding AP's own BSS on the basis of the received information.

An AP that actively accepts the isolated STA in another BSS is defined as "accepting AP" in the present specification. When receiving the signal as illustrated in FIG. 12 from the surrounding AP, each AP adds the signal transmission source AP to the each AP's own accepting AP list. The information regarding the AP described in the received signal may be described in the accepting AP list.

Effects of the present example are as follows. In a case where the AP performs the operation A (see FIG. 7) when requesting the subordinate isolated STA to be connected to another AP, the AP can effectively perform the SR communication and the UL MU communication in the AP's own BSS by causing another BSS to accept the isolated STA. As a result, the throughput is improved by spatial reuse in the AP's own BSS.

Furthermore, in a case where the AP performs the operation B (see FIG. 8) in a case of not requesting the subordinate isolated STA to be connected to another AP, the AP can set the parameters (the CW size, AIFS, TXOP, signal detection threshold value, and the like) with which the AP itself gets advantaged as a reward by accepting an isolated STA from another BSS. Thereby, the throughput and the communication opportunity can be improved.

In addition, even from the viewpoint of an STA moving to another BSS, the STA can easily obtain the communication opportunity by getting out of the situation where the SR communication and the UL MU communication cannot be performed by being connected to another BSS.

Originally, each BSS operates in an autonomous and distributed manner, and the operation to accept an STA of another BSS is only disadvantageous for the BSS. In contrast, the present example has introduced the action of setting the parameter to serve as a reward for the AP that has accepted the isolated STA, thereby realizing a cooperative operation between APs not connected by a backhaul.

Figure 13:
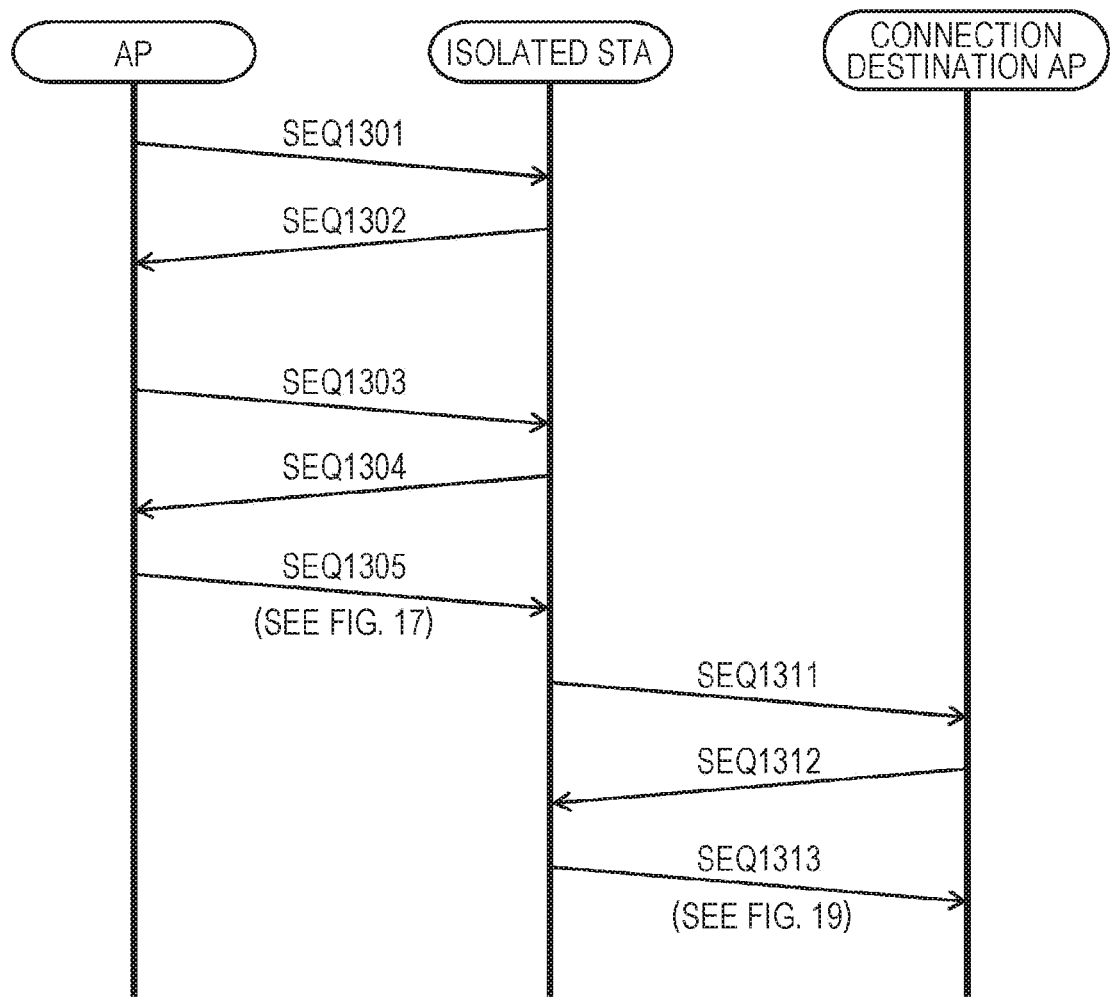
FIG. 13 is a diagram illustrating a modification of the sequence of the communication according to Example 1.

FIG. 13 illustrates a modification of the communication sequence performed among the AP, the subordinate isolated STA of the AP, and the new connection destination AP of the isolated STA in Example 1. The illustrated communication sequence assumes that the isolated STA is connectable to another AP (the connection destination AP in FIG. 3).

The AP requests the subordinate STA to transmit the information regarding the communication quality and the information regarding the implementation status of the SR communication and the UL MU communication (SEQ1301). In response to the request, the STA returns the requested information to the AP (SEQ1302). Then, as a result of the AP investigating the implementation statuses of SR communication and UL MU communication of each subordinate STA, the presence of an isolated STA falling outside a distribution of the entire subordinate STAs is revealed. Since the processing for determining the presence of the isolated STA performed by the AP is similar to the above-described processing, detailed description is omitted.

The AP requests the isolated STA to transmit the information regarding other connectable APs (SEQ1303). In response to the request, the isolated STA returns the information regarding other connectable APs to the AP (SEQ1304). The information regarding other connectable APs returned by the isolated STA may include the identification information such as service set identifiers (SSID) of the connectable APs, the magnitude of received power, the signal-to-noise power ratio, the implementation status of the SR communication or the UL MU communication, and the like. Then, the AP determines whether or not to change the connection of the isolated STA to another AP. Since the processing for determining whether or not to connect the isolated STA to another AP performed by the AP is similar to the above-described processing, detailed description is omitted.

Next, the AP requests the subordinate isolated STA to be connected to the specified another AP, and transmits a signal including reset AP's own parameter information to the isolated STA (SEQ1305). The AP may reset the AP's own parameter information so that the another AP gets advantaged (or can easily obtain the communication opportunity) as a reward for the another AP for accepting the subordinate isolated STA.

The isolated STA requests connection to the specified another AP (SEQ1311). Then, when receiving a reply indicating that the isolated STA is connectable from the another AP (SEQ1312), the isolated STA transmits a signal including the parameter information sent from the previously connected AP to the another AP that will be a new connection destination (SEQ1313). Here, the parameter information received by the new connection destination AP is the original connection destination AP's own parameter information set in return for accepting the isolated STA. Therefore, the new connection destination AP is expected to more easily obtain the communication opportunity by resetting the parameter information within the range allowed by the received parameter information.

Note that, in a case where a plurality of isolated STAs to be determined is present, a sequence similar to the above-described sequence is performed for each of the individual isolated STAs.

Figure 14:
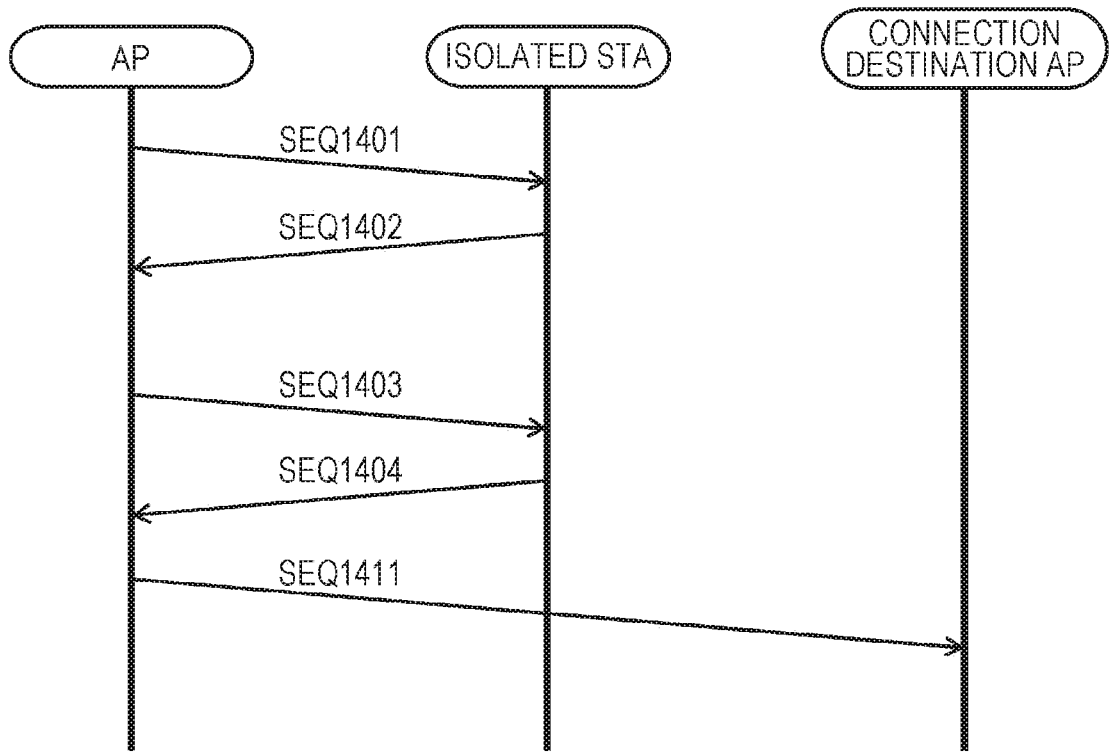
FIG. 14 is a diagram illustrating another modification of the sequence of the communication according to Example 1.

FIG. 14 illustrates another modification of the communication sequence performed among the AP, the subordinate isolated STA of the AP, and the connection destination AP in Example 1. The illustrated communication sequence assumes that the isolated STA cannot be connected to another AP (the connection destination AP in FIG. 14) and an isolated STA of the another AP is acceptable.

The AP requests the subordinate STA to transmit the information regarding the communication quality and the information regarding the implementation status of the SR communication and the UL MU communication (SEQ1401). In response to the request, the STA returns the requested information to the AP (SEQ1402). Then, as a result of the AP investigating the implementation statuses of SR communication and UL MU communication of each subordinate STA, the presence of an isolated STA falling outside a distribution of the entire subordinate STAs is revealed. Since the processing for determining the presence of the isolated STA performed by the AP is similar to the above-described processing, detailed description is omitted.

The AP requests the isolated STA to transmit the information regarding other connectable APs (SEQ1403). In response to the request, the isolated STA returns the information regarding other connectable APs to the AP (SEQ1404). The AP determines whether or not to change the connection of the isolated STA to another AP. Since the processing for determining whether or not to connect the isolated STA to another AP performed by the AP is similar to the above-described processing, detailed description is omitted. Then, the AP determines whether or not to change the connection of the isolated STA to another AP.

In a case where the AP determines that the subordinate isolated STA is not connectable to another AP, the AP gives up delivery of the isolated STA to the another AP. Furthermore, in a case where the AP can accommodate an isolated STA connected to another AP, the AP notifies the surrounding AP that the AP can accept the isolated STA (SEQ1411). The AP is expected to receive preferential treatment of setting parameters (for example, a contention window size, an arbitration inter frame space (AIFS), a signal detection value, and the like) as a reward from the surrounding AP by accepting the isolated STA of another BSS even in a case where the subordinate isolated STA cannot be accepted by the surrounding AP.

Note that, in a case where a plurality of isolated STAs to be determined is present, a sequence similar to the above-described sequence is performed for each of the individual isolated STAs.

The AP basically determines whether or not to connect the subordinate isolated STA to another AP according to the processing procedures illustrated in FIGS. 5 and 6. Note that the AP generates the parameter information to be set to the AP itself instead of the parameter information to be set to the connection destination AP, as processing corresponding to step S603. For example, the AP generates the parameter information of the AP itself (in which the communication opportunity of the AP itself is suppressed) so as to reset the parameter information with which the connection destination AP gets advantaged as a reward for accepting the subordinate isolated STA. Then, the AP executes the operation A when determining to connect the subordinate isolated STA to another AP, and executes the operation B when determining not to connect the subordinate isolated STA to another AP.

Figure 15:
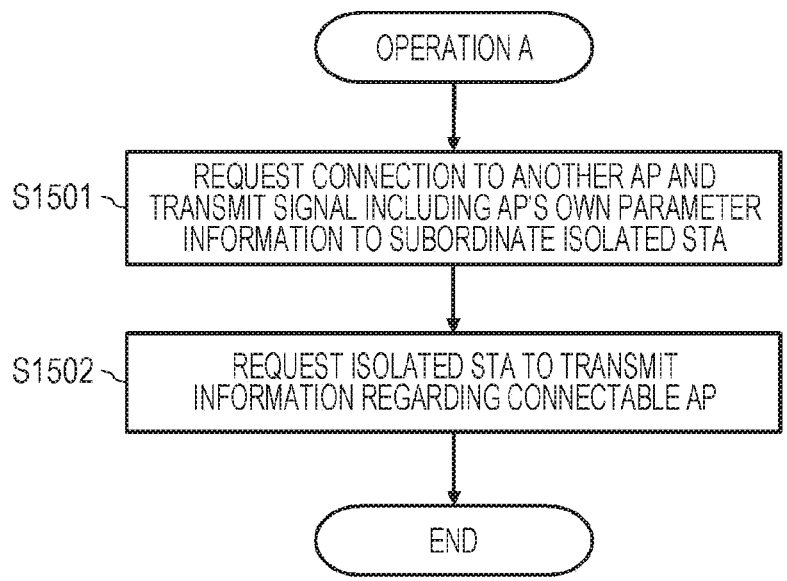
FIG. 15 is a flowchart illustrating a processing procedure of an operation A performed by an AP when the AP connects a subordinate isolated STA to another AP.

FIG. 15 illustrates a processing procedure of the "operation A" performed by the AP when the AP connects the subordinate isolated STA to another AP according to the modification of the communication sequence illustrated in FIG. 13 in the form of flowchart.

The AP requests the subordinate isolated STA to be connected to another connectable AP, and transmits the request signal including the AP's own parameter information reset when connection is changed to the another AP (step S1501). This parameter information includes a value with which the another AP gets advantaged (or the another AP can more easily obtain the communication opportunity) as a reward for accepting the isolated STA.

Then, the AP resets the AP's own parameter information to the value transmitted in step S1501 when the subordinate isolated STA is connected to the another AP (step S1502). Thereby, the another AP that has accepted the isolated STA is expected to easily obtain the communication opportunity.

Figure 17:
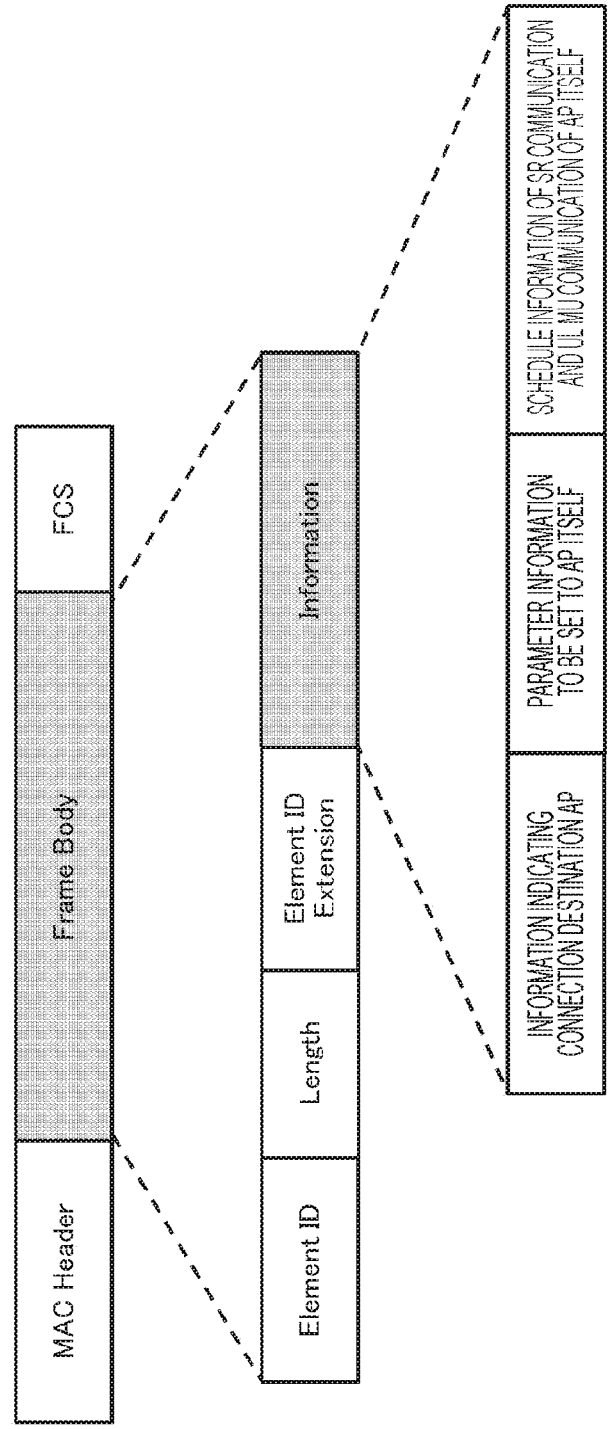
FIG. 17 is a diagram illustrating a frame configuration of a signal transmitted by an AP to a subordinate isolated STA when the AP requests the subordinate isolated STA to be connected to another AP.

FIG. 17 illustrates a frame configuration of the request signal transmitted by the AP to the subordinate isolated STA in step S1501 in the flowchart illustrated in FIG. 15 and in the SEQ1305 in the communication sequence illustrated in FIG. 13. The illustrated frame includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, in the information part (Information) of the frame body, information indicating another AP to which the subordinate isolated STA is requested to connect, parameter information scheduled to be set for the transmission source AP itself, and schedule information of the SR communication and the UL MU communication in the transmission source AP's own BSS are included.

The information indicating a connection destination AP may include either one of or both of an SSID and BSS color of the connection destination AP. Furthermore, the parameter information set for the transmission source AP itself is any one of or a combination of the CW size, AIFS, TXOP, and signal detection threshold value set for the AP itself after the subordinate isolated STA changes the connection to the connection destination AP.

The parameter information set for the transmission source AP itself and the schedule information of the SR communication and the UL MU communication in the transmission source AP's own BSS are AP's own parameter information and schedule set by the AP as processing corresponding to step S603 of the flowchart illustrated in FIG. 6. When the AP determines another AP to which the subordinate isolated STA is connected, the AP resets the AP's own parameter information (in which the communication opportunity is suppressed) so that the another AP gets advantaged (or can easily obtain the communication opportunity) as a reward for accepting the isolated STA, and sets a schedule of performing the SR communication and the UL MU communication in the AP'S own BSS so that the another AP can more easily obtain the communication opportunity.

Figure 18:
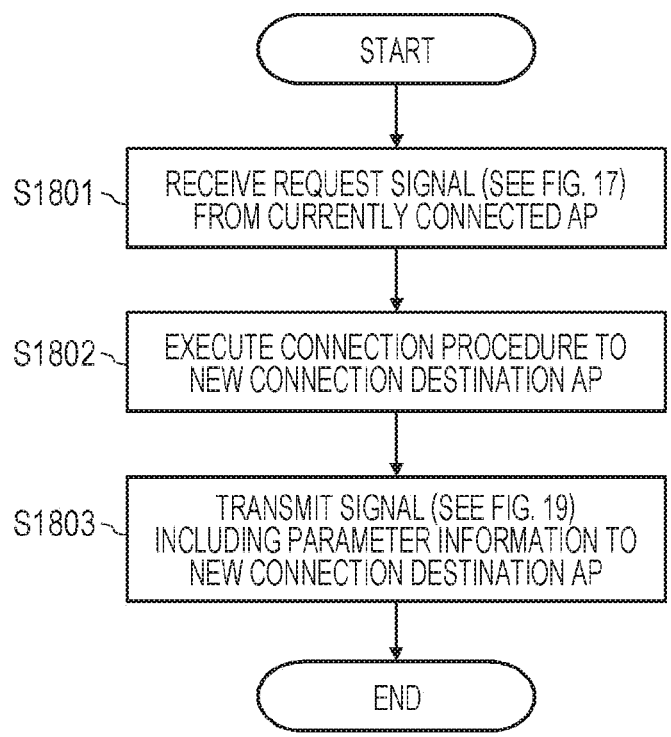
FIG. 18 is a flowchart illustrating a processing procedure performed when an isolated STA has received a signal requesting connection to another AP.

FIG. 18 illustrates a processing procedure performed when the isolated STA has received the request signal requesting connection to another AP from the currently connected AP in the form of flowchart.

When receiving the signal requesting connection to another connectable AP from the connected AP (step S1801), the isolated STA performs the connection procedure to the another AP (step S1802)

Then, when the connection to the another AP requested to connect to is established, the isolated STA transmits a signal including the parameter information and the schedule information of the original connection destination AP, which are described in the signal requesting the connection, to the another AP (step S1803)

Figure 19:
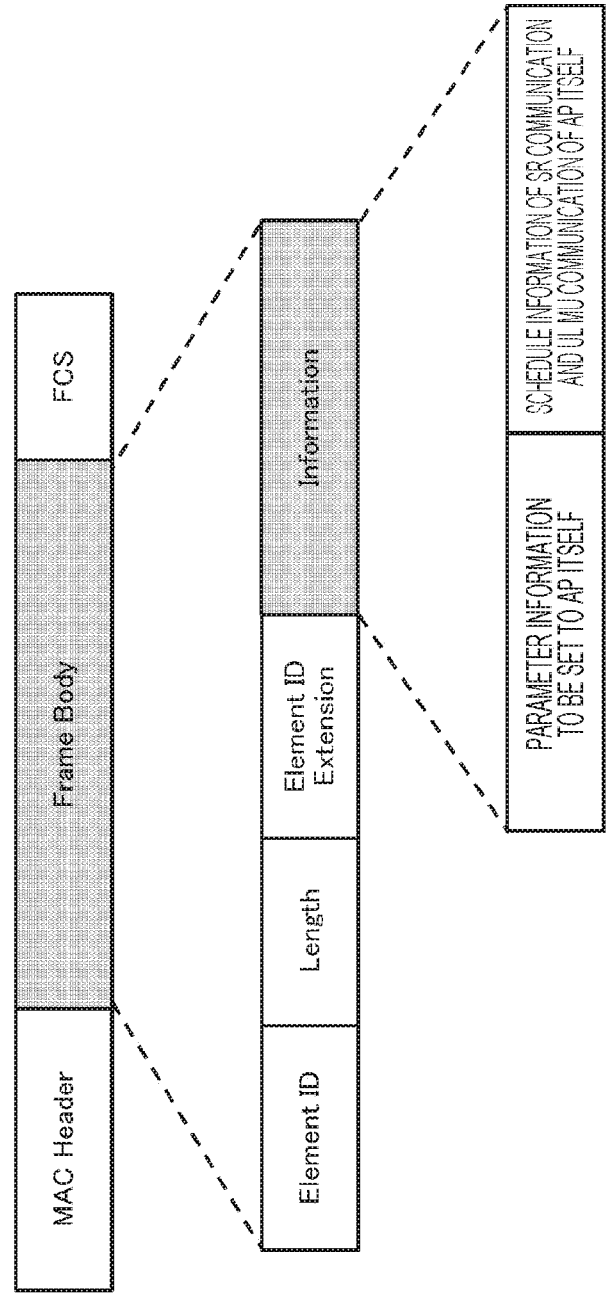
FIG. 19 is a diagram illustrating a frame configuration of a signal transmitted by an isolated STA to a new connection destination AP.

FIG. 19 illustrates a frame configuration of the signal transmitted by the isolated STA to the new connection destination AP in step S1803 in the flowchart in FIG. 18 and in SEQ1313 in the communication sequence in FIG. 13. The illustrated frame includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, in the information part (Information) of the frame body, the parameter information of the original connection destination AP and the schedule information of the SR communication and the UL MU communication of the original connection destination AP are included.

The parameter information of the original connection destination AP is any one of or a combination of the CW size, AIFS, TXOP, and signal detection threshold value. The parameter information and the schedule information of the original connection destination AP are AP's own parameter information and schedule information set by the AP as processing corresponding to step S603 of the flowchart illustrated in FIG. 6. The original connection destination AP resets the AP's own parameter information (in which the communication opportunity is suppressed) so that the new connection destination AP (in other words, the destination of the signal illustrated in FIG. 19) gets advantaged (or can easily obtain the communication opportunity) as a reward for the new connection destination AP accepting the isolated STA, and further sets a schedule of the SR communication and the UL MU communication in the AP'S own BSS so that the new connection destination AP can more easily obtain the communication opportunity. Therefore, the new connection destination AP can reset the AP's own parameter information (in which the communication opportunity is suppressed) so as to get advantaged (or to easily obtain the communication opportunity) within the range allowed by the parameter information and the schedule information set for the original connection destination AP itself, and can further set a schedule of the SR communication and the UL MU communication in the AP's own BSS so as to easily obtain the communication opportunity, in return for accepting the isolated STA.

Figure 16:
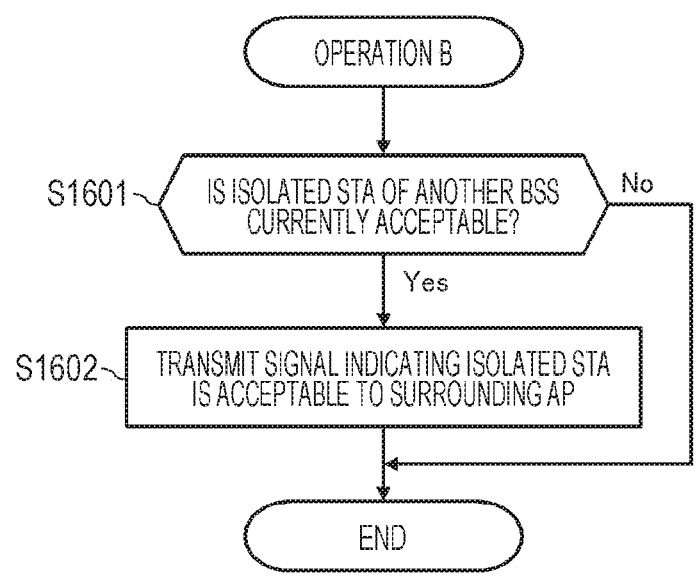
FIG. 16 is a flowchart illustrating a processing procedure of an operation B performed by an AP when the AP does not connect a subordinate isolated STA to another AP.

Furthermore, FIG. 16 illustrates a processing procedure of the "operation B", which is performed by the AP when another AP to which the subordinate isolated STA is connectable is not present or when the AP does not connect the subordinate isolated STA to another AP according to the modification of the communication sequence illustrated in FIG. 14, in the form of flowchart.

The processing procedure illustrated in FIG. 16 in the operation B is basically similar to the processing procedure illustrated in FIG. 8. The AP determines whether or not the AP itself can currently accept an isolated STA of another BSS (step S1601). Then, in a case where the AP can accept the isolated STA of another BSS (Yes in step S1601), the AP notifies the surrounding APs of a signal indicating that the AP can accept the isolated STA (step S1602). The frame configuration of this signal is as illustrated in FIG. 12, for example. On the other hand, in a case where the AP cannot accept the isolated STA of another BSS (No in step S1601), the AP terminates the processing without doing anything.

In a case where the AP performs the operation A (see FIG. 15) when requesting the subordinate isolated STA to be connected to another AP, the AP can effectively perform the SR communication and the UL MU communication in the AP's own BSS by causing another BSS to accept the isolated STA. As a result, the throughput is improved by spatial reuse in the AP's own BSS.

Furthermore, in a case where the AP performs the operation B (see FIG. 16) in a case of not requesting the subordinate isolated STA to be connected to another AP, the AP can set the parameters (the CW size, AIFS, TXOP, signal detection threshold value, and the like) with which the AP itself gets advantaged as a reward by accepting an isolated STA from another BSS. Thereby, the throughput and the communication opportunity can be improved.

In addition, even from the viewpoint of an STA moving to another BSS, the STA can easily obtain the communication opportunity by getting out of the situation where the SR communication and the UL MU communication cannot be performed by being connected to another BSS. Furthermore, unfairness of the communication opportunities of each STA in the BSS can be eliminated.

Originally, each BSS operates in an autonomous and distributed manner, and the operation to accept an STA of another BSS is only disadvantageous for the BSS. In contrast, the present example has introduced the action of setting the parameter to serve as a reward for the AP that has accepted the isolated STA, thereby realizing a cooperative operation between APs not connected by a backhaul.

Figure 20:
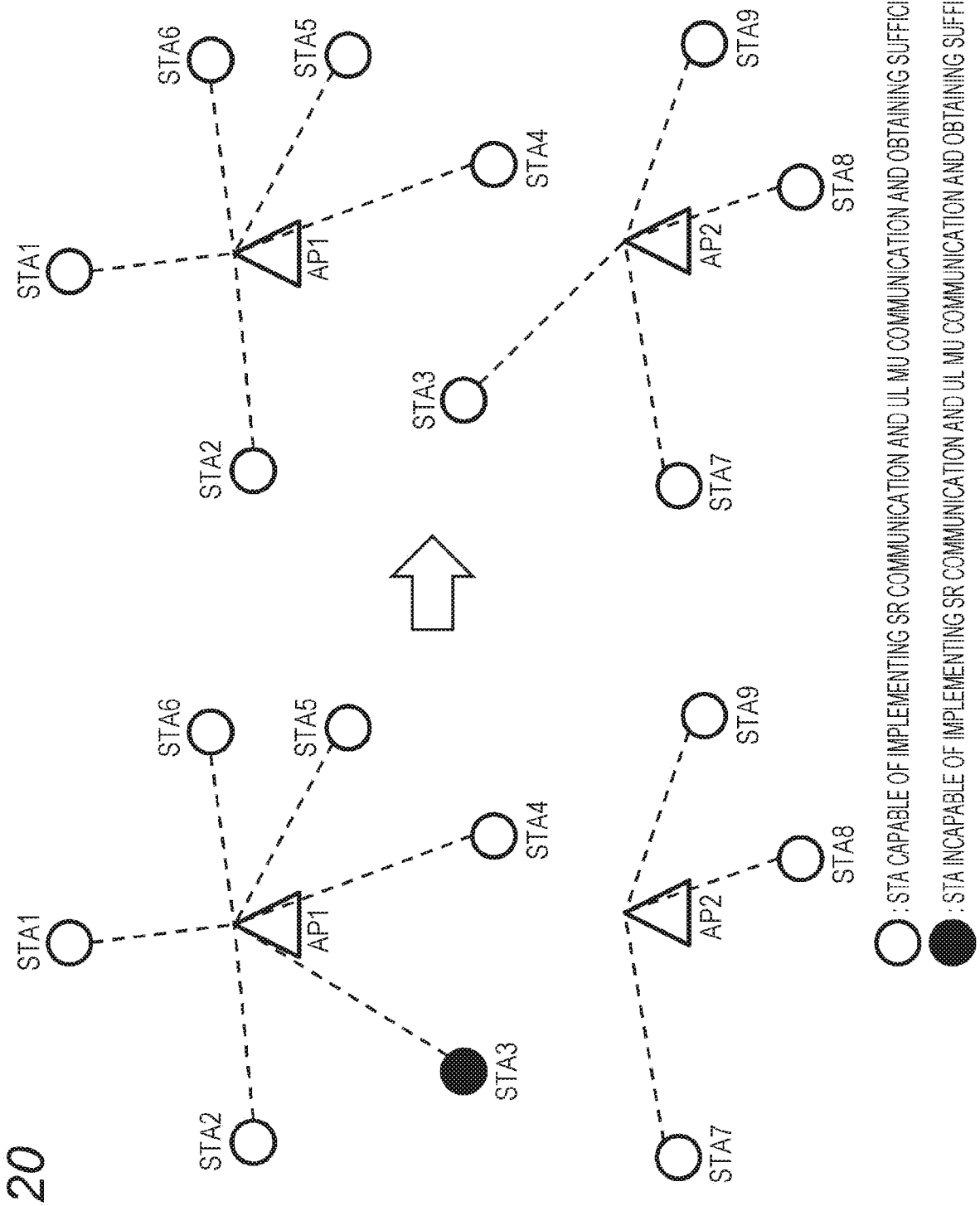
FIG. 20 is a diagram illustrating an operation example in a wireless communication system to which Example 1 is applied.

FIG. 20 illustrates an operation example in a wireless communication system to which the present example is applied. The illustrated wireless communication system includes a BSS operated by a base station AP1 and a BSS operated by a base station AP2. In an initial state illustrated on the left side in FIG. 20, terminals $STA_1$ to STA6 are connected to the AP1, and terminals STA7 to 9 are connected to the AP2.

The STA3 is an isolated STA of the subordinate STAs of the AP1. Since the STA3 is also connectable to the AP2, the AP1 requests the STA3 to be connected to the AP3. Furthermore, the AP1 resets AP1's own parameter information so that the AP2 gets advantaged (or can easily obtain a communication opportunity) as a reward for accepting the STA3, and further sets a schedule of performing the SR communication and the UL MU communication in an AP1's own BSS such that the AP2 can easily obtain the communication opportunity.

As illustrated on the right side in FIG. 20, the AP1 becomes able to effectively perform the SR communication and the UL MU communication in the AP1's own BSS by causing the surrounding AP2 to accept the STA3 isolated under the control of the AP1. As a result, the throughput is improved by spatial reuse in the AP1's own BSS.

On the other hand, the operation to accept the STA3 from the BSS of the AP1 is originally only disadvantageous for an AP2's own BSS. However, the AP1 sets the parameters such that the AP2 gets advantaged (or can easily obtain the communication opportunity) as a reward to the AP2 for accepting the isolated STA3. Therefore, the BSS on the AP2 side can also obtain the benefit.

Example 2

Figure 21:
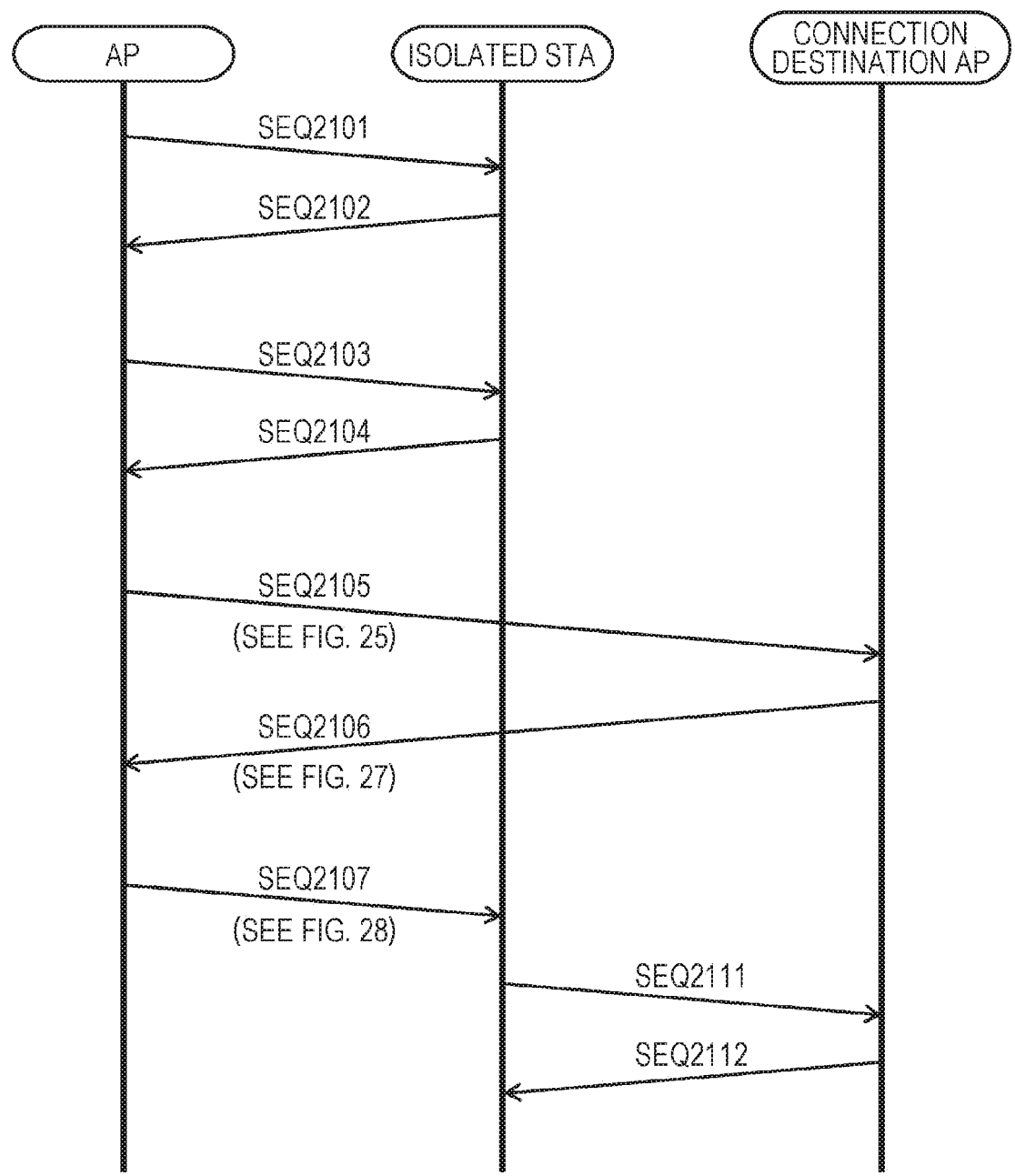
FIG. 21 is a diagram illustrating a sequence example of communication according to Example 2.

FIG. 21 illustrates a communication sequence example performed among an AP, a subordinate isolated STA of the AP, and a new connection destination AP of the isolated STA in Example 2. The illustrated communication sequence assumes that the isolated STA is connectable to another AP (the connection destination AP in FIG. 21).

The AP requests the subordinate STA to transmit information regarding communication quality and information regarding an implementation status of SR communication or UL MU communication (SEQ2101). In response to the request, the STA returns the requested information to the AP (SEQ2102). Then, as a result of the AP investigating the implementation statuses of SR communication and UL MU communication of each subordinate STA, the presence of an isolated STA falling outside a distribution of the entire subordinate STAs is revealed.

The AP requests the isolated STA to transmit information regarding other connectable APs (SEQ2103). In response to the request, the isolated STA returns the information regarding other connectable APs to the AP (SEQ2104). The information regarding other connectable APs returned by the isolated STA may include identification information such as SSIDs of the connectable APs, the magnitude of received power, a signal-to-noise power ratio, the implementation status of SR communication or UL MU communication, and the like (the same as above).

The AP determines whether or not to change connection of the isolated STA to another AP on the basis of the information returned by the isolated STA and the like. Then, the AP transmits an inquiry signal inquiring whether or not the isolated STA is acceptable to another AP determined as a new connection destination of the isolated STA (SEQ2105). The inquiry signal includes information regarding the subordinate isolated STA and parameter information set for the another AP. The parameter information is set as a reward for the another AP for accepting the isolated STA. The AP determines a value of the parameter information with which a communication opportunity can be more easily obtained according to the degree of wishing the another AP to accept the subordinate isolated STA, for example.

The another AP that has received the inquiry determines whether or not to accept the isolated STA on the basis of information regarding the isolated STA and the parameter information included in the inquiry signal, information of a traffic load held by the another AP itself, and the like. Then, the another AP returns an answer signal indicating whether or not to accept the isolated STA (SEQ2106). FIG. 21 illustrates a communication sequence of the case of returning the answer signal indicating that the another AP that has received the inquiry signal can accept the isolated STA.

When the AP confirms that the AP to which the inquiry signal has been sent can accept the isolated STA on the basis of the received answer signal, the AP requests the subordinate isolated STA to be connected to the new connection destination AP, and transmits a request signal including information regarding an implementation status of the SR communication or the UL MU communication in a BSS of a new connection destination AP (SEQ2107).

The isolated STA requests connection to the new connection destination AP specified by the request signal (SEQ2111). Then, when the isolated STA receives a reply indicating that the AP can accept the isolated STA from the AP (SEQ2112), the connection to the new connection destination AP is completed. Since the new connection destination AP being able to accept the isolated STA has already been confirmed, smooth implementation of connection change of the isolated STA is expected.

Note that, in a case where a plurality of isolated STAs to be determined is present, a sequence similar to the above-described sequence is performed for each of the individual isolated STAs.

Figure 22:
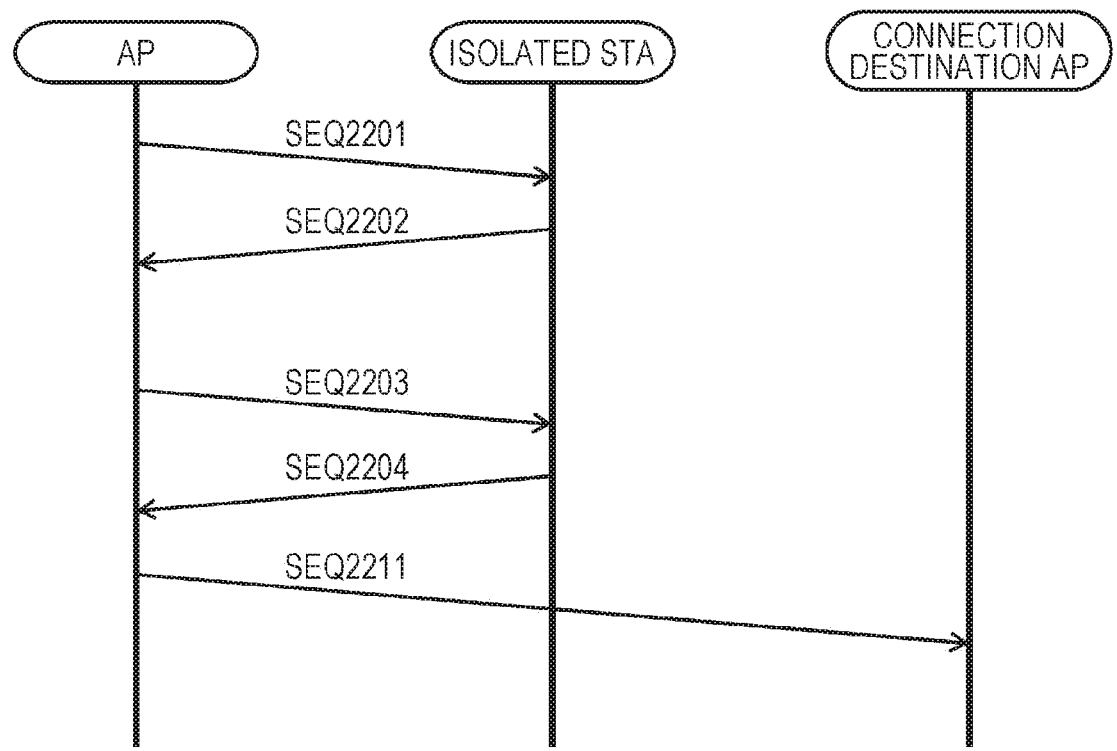
FIG. 22 is a diagram illustrating a sequence example of another communication according to Example 2.

FIG. 22 illustrates another communication sequence example performed among the AP, the subordinate isolated STA of the AP, and the connection destination AP in Example 2. The illustrated communication sequence assumes that the isolated STA cannot be connected to another AP (the connection destination AP in FIG. 22) and an isolated STA of the another AP is acceptable.

The AP requests the subordinate STA to transmit the information regarding the communication quality and the information regarding the implementation status of the SR communication and the UL MU communication (SEQ2201). In response to the request, the STA returns the requested information to the AP (SEQ2202). Then, as a result of the AP investigating the implementation statuses of SR communication and UL MU communication of each subordinate STA, the presence of an isolated STA falling outside a distribution of the entire subordinate STAs is revealed.

The AP requests the isolated STA to transmit the information regarding other connectable APs (SEQ2203). In response to the request, the isolated STA returns the information regarding other connectable APs to the AP (SEQ2204). The information regarding other connectable APs returned by the isolated STA may include the identification information such as SSIDs of the connectable APs, the magnitude of received power, a signal-to-noise power ratio, the implementation status of SR communication or UL MU communication, and the like (the same as above). Then, the AP determines whether or not to change the connection of the isolated STA to another AP.

In a case where the AP determines that the subordinate isolated STA is not connectable to another AP, the AP gives up delivery of the isolated STA to the another AP. Furthermore, in a case where the AP can accommodate an isolated STA connected to another AP, the AP notifies the surrounding AP that the AP can accept the isolated STA (SEQ2211). The AP is expected to receive preferential treatment of setting parameters (for example, a contention window size, an arbitration inter frame space (AIFS), a signal detection value, and the like) as a reward from the surrounding AP by accepting the isolated STA of another BSS even in a case where the subordinate isolated STA cannot be accepted by the surrounding AP.

Note that, in a case where a plurality of isolated STAs to be determined is present, a sequence similar to the above-described sequence is performed for each of the individual isolated STAs.

Since the AP basically determines whether or not to connect the subordinate isolated STA to another AP according to the processing procedures illustrated in FIGS. 5 and 6, detailed description is omitted here. Then, even in Example 2, the AP executes the operation A when determining to connect the subordinate isolated STA to another AP, and executes the operation B when determining not to connect the subordinate isolated STA to another AP.

Figure 23:
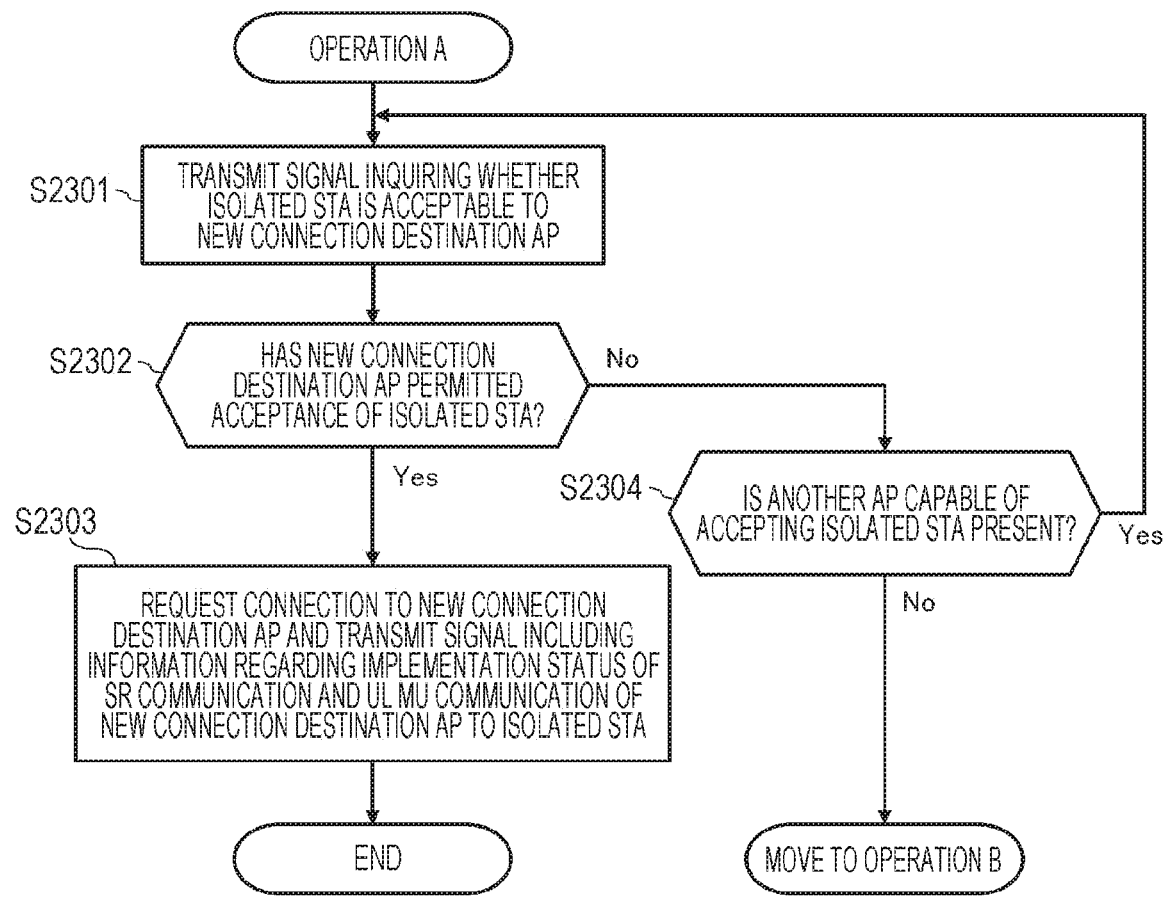
FIG. 23 is a flowchart illustrating a processing procedure of an operation A performed by an AP when the AP connects a subordinate isolated STA to another AP in Example 2.

FIG. 23 illustrates a processing procedure of the "operation A" performed by the AP when the AP connects the subordinate isolated STA to another AP in Example 2 in the form of flowchart.

The AP transmits an inquiry signal inquiring whether or not the isolated STA is acceptable to another AP determined as a new connection destination of the isolated STA (step S2301).

Then, in a case where connection of the isolated STA is permitted by the new connection destination AP of the isolated STA (Yes in step S2302), the AP requests the subordinate isolated STA to be connected to the new connection destination AP, and transmits a signal including information regarding an implementation status of the SR connection destination and the UL MU communication in a BSS of the new connection destination AP (step S2303). In a case where a plurality of APs to which the isolated STA is connectable is present, the AP transmits the request signal to the isolated STA in a descending order.

On the other hand, in a case where the new connection destination AP does not permit the acceptance of the isolated STA (No in step S2302), the AP checks whether or not an AP to which the isolated STA is connectable is further present (step S2304)

In a case where an AP to which the isolated STA is connectable is further present (Yes in step S2304), the processing returns to step S2301, and transmission of an inquiry signal similar to the above inquiry signal is repeatedly performed for the another AP. Furthermore, in a case where an AP that can accept the isolated STA is no longer present (No in step S2304), the AP gives up changing the connection destination of the subordinate isolated STA and performs the operation B.

Figure 24:
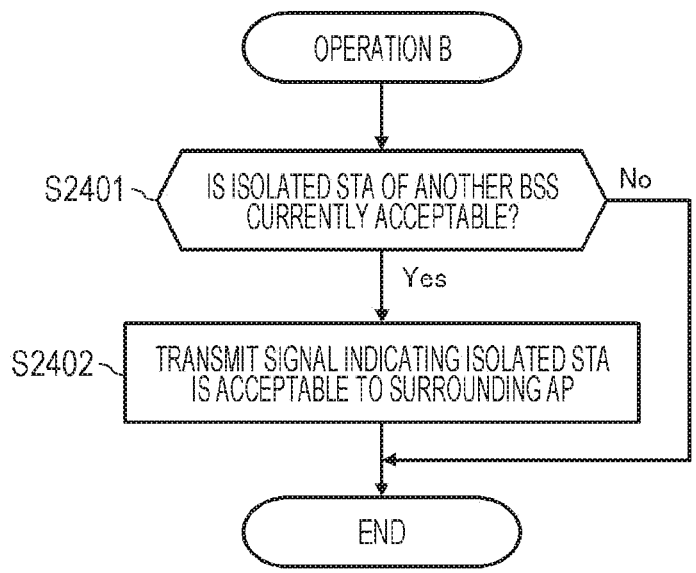
FIG. 24 is a flowchart illustrating a processing procedure of an operation B performed by an AP when the AP does not change a connection destination of a subordinate isolated STA in Example 2.

Furthermore, FIG. 24 illustrates a processing procedure of the operation B performed by the AP when the AP does not change the connection destination of the subordinate isolated STA in Example 2 in the form of flowchart.

The AP determines whether or not the AP itself can currently accept an isolated STA of another BSS (step S2401). Then, in a case where the AP can accept the isolated STA of another BSS (Yes in step S2401), the AP notifies the surrounding APs of a signal indicating that the AP can accept the isolated STA (step S2402). On the other hand, in a case where the AP cannot accept the isolated STA of another BSS (No in step S2401), the AP terminates the processing without doing anything.

Figure 25:
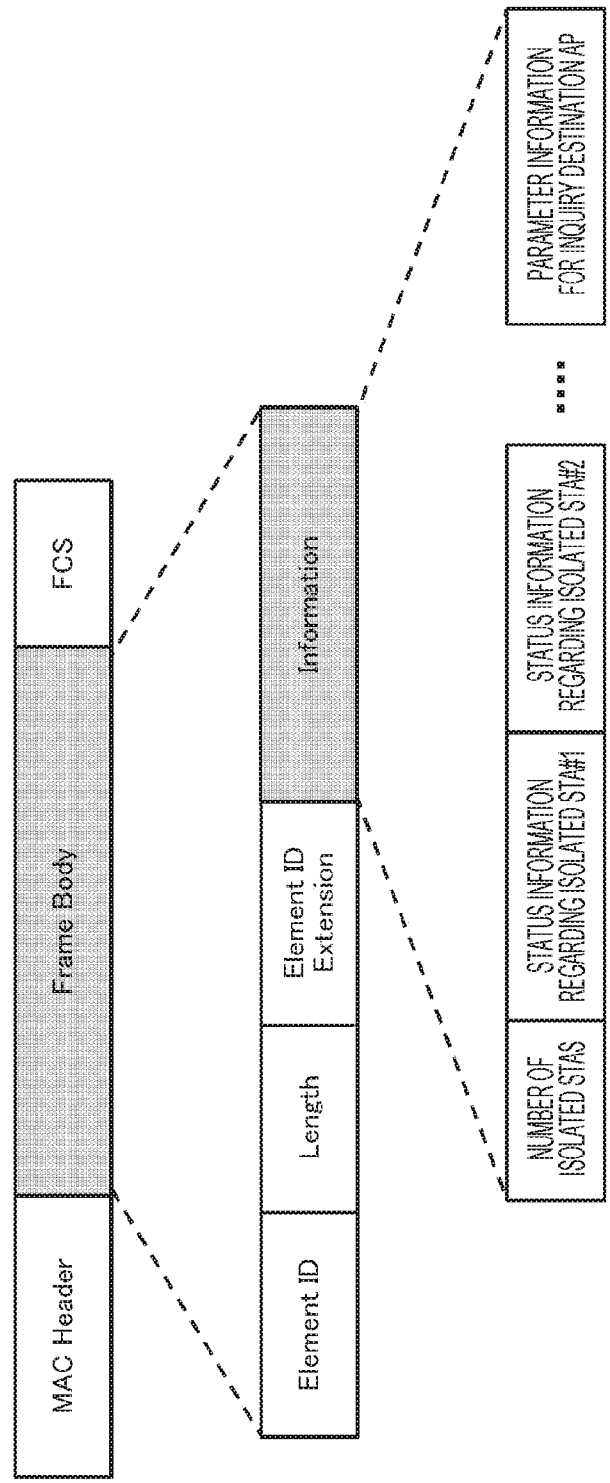
FIG. 25 is a diagram illustrating a frame configuration of a signal inquiring, by an AP, of another AP whether or not an isolated STA is acceptable.

FIG. 25 illustrates a frame configuration of the signal inquiring, by the AP, of another AP whether or not the isolated STA is acceptable in step S2301 in the flowchart in FIG. 23 and SEQ2105 in the communication sequence in FIG. 21. The illustrated frame includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, the information part (Information) of the frame body includes information for inquiring whether or not an isolated STA is acceptable.

The number of isolated STAs is a parameter representing the number of STAs determined as isolated STAs under the control of an inquiry source AP. The another AP that has received the signal can determine whether or not there is a possibility of performing, by the inquiry source AP, the SR communication and the UL MU communication by referring to the parameter.

Then, following the number of isolated STAs, status information regarding the individual isolated STAs follows. The status information regarding the isolated STA is any one of or a combination of an Associate ID (AID) of the isolated STA, a Partial AID, current RSSI and SINR of the isolated STA, the number of other connectable APs of the isolated STA, an implementation status of the SR communication or the MU communication of the BSS to which the isolated STA belongs, a reason for being determined as an isolated STA.

One signal inquiring whether or not the isolated STA is acceptable may inquire whether or not a plurality of isolated STAs is acceptable at the same time. In this case, as illustrated in FIG. 25, the status information regarding the isolated STA is added by the number of the isolated STAs to be inquired.

The parameter information for the inquiry destination AP is parameter information (CW size, AIFS, TXOP, signal detection threshold value, and the like) generated for the isolated STA determined by the AP to change connection to another AP in step S603 of the flowchart illustrated in FIG. 6, similarly to Example 1. The AP generates the parameter information set as a reward for the inquiry destination AP for accepting the AP's own isolated STA. The AP determines a value of the parameter information with which the inquiry destination AP can more easily obtain a communication opportunity according to the degree of wishing the another AP to accept the subordinate isolated STA, for example. Furthermore, the inquiry destination AP sets or updates the inquiry destination AP's own parameters on the basis of the parameter information herein described in a case of accepting the isolated STA.

Figure 26:
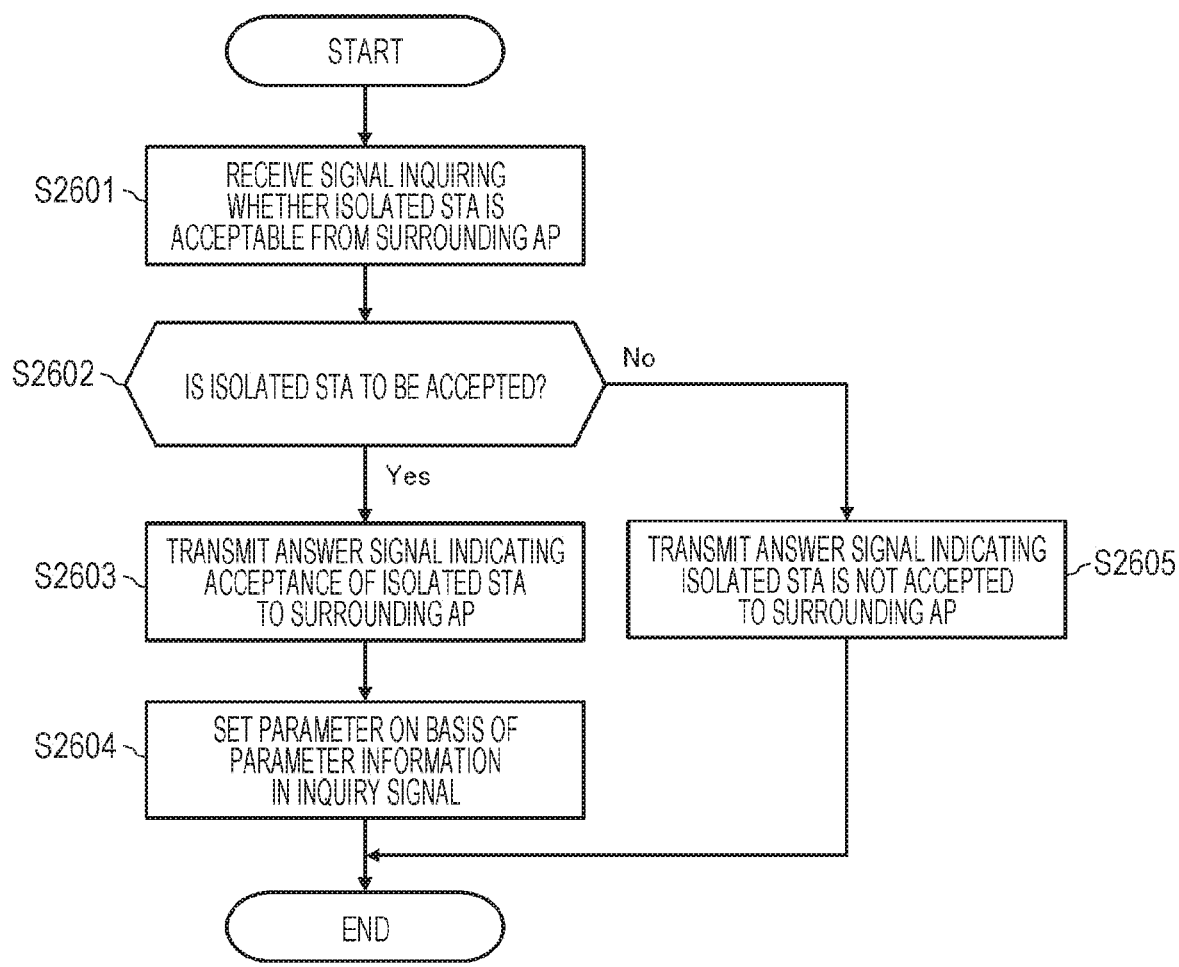
FIG. 26 is a flowchart illustrating a processing procedure of a signal inquiring whether or not an isolated STA is acceptable.

FIG. 26 illustrates a procedure for processing an inquiry signal inquiring whether or not an isolated STA is acceptable, which is received by the AP from another AP, in the form of flowchart.

When receiving the signal inquiring whether or not an isolated STA is acceptable from a surrounding AP (step S2601), the AP determines whether or not to accept the isolated STA (step S2602). The AP determines, for example, whether or not to accept the isolated STA on the basis of the status information of the isolated STA such as the number of isolated STAs, the implementation status of the SR communication and the UL MU communication, and the reason of being determined as the isolated STA, which is described in the received inquiry signal, further, information of a traffic load held by the AP itself, and the like.

In a case where the AP accepts the inquired isolated STA (Yes in step S2602), the AP returns an answer signal indicating that the AP accepts the isolated STA to the inquiry source AP (step S2603), and sets or updates the AP's own parameters on the basis of the parameter information described in the inquiry signal (step S2604).

On the other hand, in a case where the AP does not accept the inquired isolated STA (No in step S2602), the AP returns an answer signal indicating that the AP does not accept the isolated STA to the inquiry source AP (step S2605) and terminates the present processing.

Figure 27:
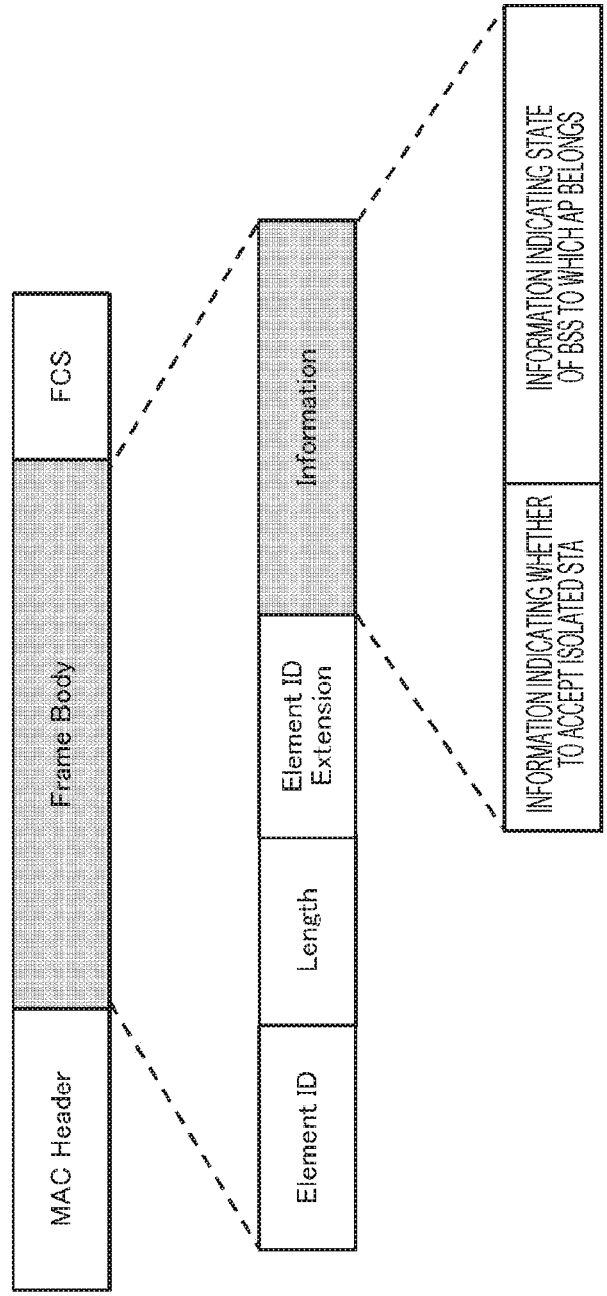
FIG. 27 is a diagram illustrating a frame configuration of an answer signal to an inquiry about acceptance of an isolated STA.

FIG. 27 illustrates a frame configuration of the answer signal answered by the AP to the inquiry signal about acceptance of the isolated STA from the surrounding AP in step S2603 or S2605 in the flowchart illustrated in FIG. 26 and SEQ2106 in the communication sequence illustrated in FIG. 21. The illustrated frame includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, in the information part (Information) of the frame body, information indicating the answer to the inquiry about acceptance of the isolated STA (in other words, whether or not to accept the isolated STA) and information indicating a state of a BSS to which the AP belongs.

The information indicating whether or not to accept the isolated STA is a 1-bit flag indicating whether or not to accept. The information indicating the state of the BSS to which the AP belongs includes the information of the implementation status of the SR communication and the UL MU communication in the AP's own BSS, the information of the traffic load, the number of STAs determined as isolated STAs, and the like. In a case where the AP accepts the isolated STA from the surrounding AP, the AP adds the information indicating the state of the AP's own BSS into the answer signal.

When the isolated STA belongs to the BSS of the AP that has permitted acceptance, the isolated STA can change the isolated STA's own parameters such as a signal detection value, maximum transmission power, and a communication mode on the basis of the information indicating the state of the BSS added to the answer signal. As a result, the isolated STA can be promptly set to an appropriate state for performing communication in the BSS of the new connection destination.

When receiving the answer signal indicating that the inquiry destination AP does not accept the isolated STA from the inquiry destination AP, the inquiry source AP can update the AP's own accepting AP list and update the priority of APs to which the isolated STA is connectable on the basis of the information indicating the state of the BSS added to the answer signal. As a result, the AP can more efficiently change the connection destination of the isolated STA.

Furthermore, in a case of receiving the answer signal indicating that the inquiry destination AP accepts the isolated STA from the inquiry destination AP, the inquiry source AP requests the subordinate isolated STA to be connected to the new connection destination AP, and transmits a signal including information regarding an implementation status of the SR communication and the UL MU communication in a BSS of the new connection destination AP (which is processing corresponding to step S2303 in the flowchart illustrated in FIG. 23).

Figure 28:
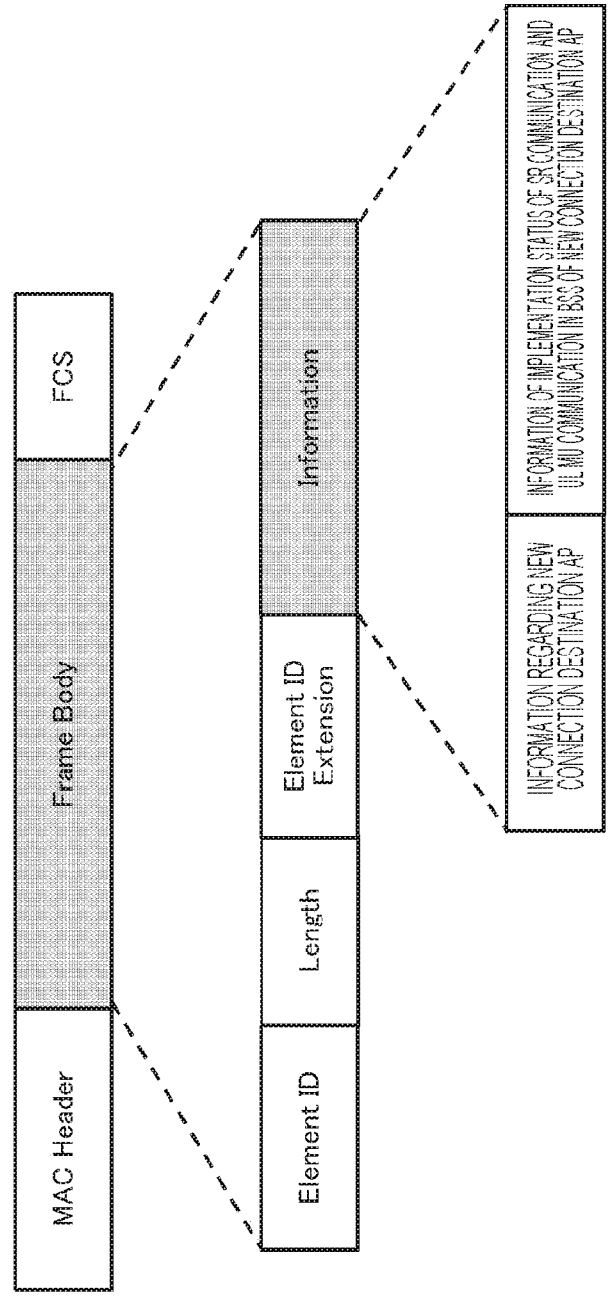
FIG. 28 is a diagram illustrating a frame configuration of a signal requesting, by an AP, a subordinate isolated STA to be connected to a new connection destination AP.

FIG. 28 illustrates a frame configuration of the request signal requesting, by the AP, the subordinate isolated STA to be connected to a new connection destination AP in step S2303 in the flowchart illustrated in FIG. 23 and in the SEQ2107 in the communication sequence illustrated in FIG. 21. The illustrated frame includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, in the information part (Information) of the frame body, information regarding the new connection destination AP and the information of the implementation status of the SR communication and the UL MU communication in the BSS of the new connection destination AP are included.

The information regarding the new connection destination AP may include either one of or both of an SSID and BSS color of the new connection destination AP. Furthermore, as the information of the implementation status of the SR communication and the UL MU communication in the BSS of the new connection destination AP, information based on the information indicating the state of the BSS to which the AP belongs, which is included in the answer signal, is described. By notifying the information of the implementation status of the SR communication and the UL MU communication in the BSS of the new connection destination AP, the isolated STA can be promptly set to an appropriate state for performing communication in the new connection destination BSS.

In a case where a plurality of APs to which the isolated STA is connectable is present, the original connection destination AP transmits the request signal to the isolated STA in a descending order. Meanwhile, in a case where AP to which the isolated STA is connectable is not present (in a case of No in step S2304 in the flowchart illustrated in FIG. 23), the AP moves onto the operation B.

In a case where the AP performs the operation A in a case of requesting the subordinate isolated STA to be connected to another AP, the AP can effectively perform the SR communication and the UL MU communication by causing another BSS to accept the isolated STA. As a result, the throughput is improved by spatial reuse in the AP's own BSS.

Furthermore, in a case where the AP performs the operation B in a case of not requesting the subordinate isolated STA to be connected to another AP, the AP can set the parameters (the CW size, AIFS, TXOP, signal detection threshold value, and the like) with which the AP itself gets advantaged as a reward by accepting an isolated STA from another BSS. Thereby, the throughput and the communication opportunity can be improved.

In addition, even from the viewpoint of an STA moving to another BSS, the STA can easily obtain the communication opportunity by getting out of the situation where the SR communication and the UL MU communication cannot be performed by being connected to another BSS. Furthermore, unfairness of the communication opportunities of each STA in the BSS can be eliminated.

Originally, each BSS operates in an autonomous and distributed manner, and the operation to accept an STA of another BSS is only disadvantageous for the BSS. In contrast, the present example has introduced the action of setting the parameter to serve as a reward for the AP that has accepted the isolated STA, thereby realizing a cooperative operation between APs not connected by a backhaul.

Figure 29:
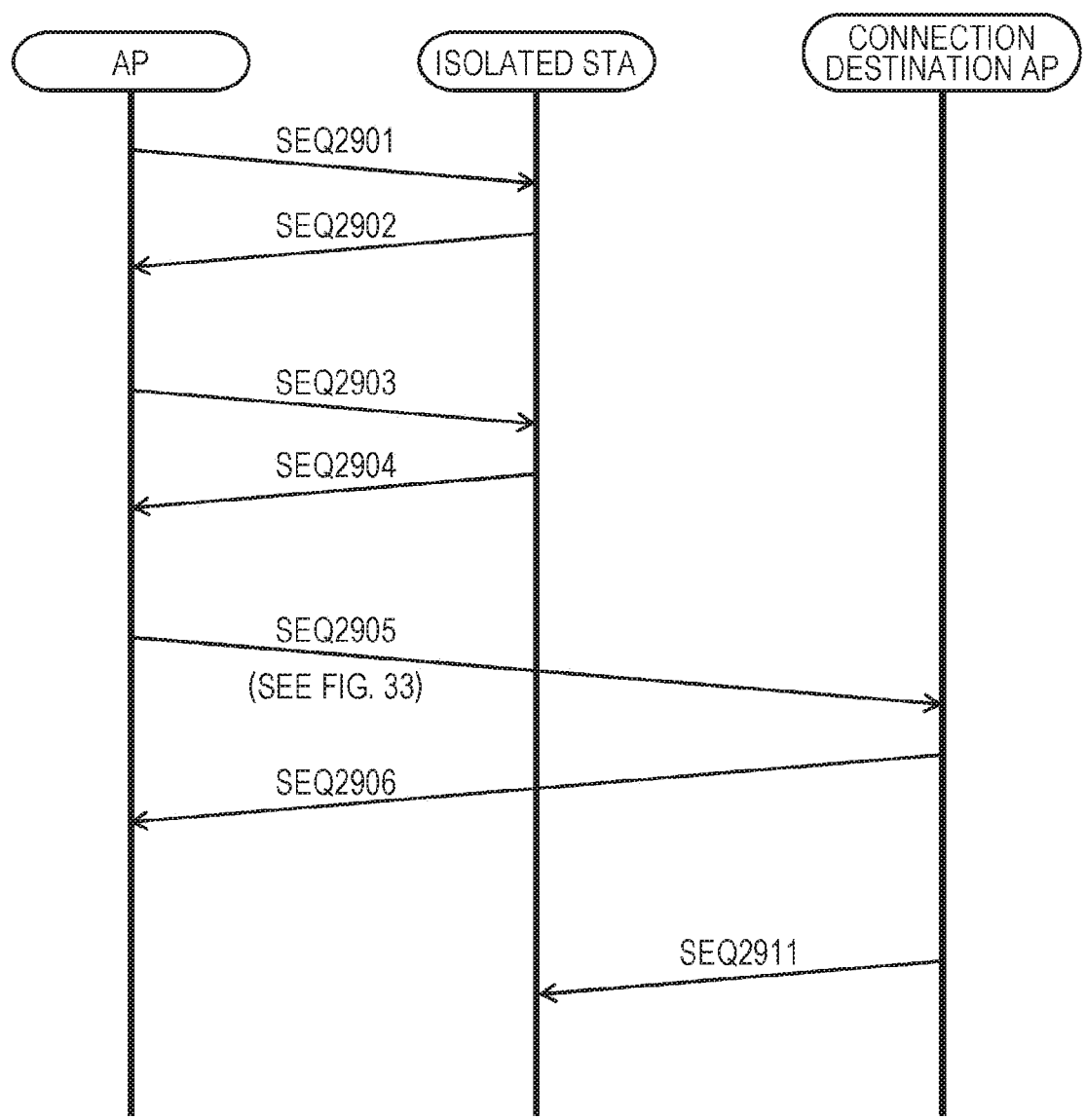
FIG. 29 is a diagram illustrating a modification of the sequence of the communication according to Example 2.

FIG. 29 illustrates a modification of the communication sequence performed among the AP, the subordinate isolated STA of the AP, and the new connection destination AP of the isolated STA in Example 2. The illustrated communication sequence assumes that the isolated STA is connectable to another AP (the connection destination AP in FIG. 29).

The AP requests the subordinate STA to transmit the information regarding the communication quality and the information regarding the implementation status of the SR communication and the UL MU communication (SEQ2901). In response to the request, the STA returns the requested information to the AP (SEQ2902). Then, as a result of the AP investigating the implementation statuses of SR communication and UL MU communication of each subordinate STA, the presence of an isolated STA falling outside a distribution of the entire subordinate STAs is revealed.

The AP requests the isolated STA to transmit the information regarding other connectable APs (SEQ2903). In response to the request, the isolated STA returns the information regarding other connectable APs to the AP (SEQ2904). The information regarding other connectable APs returned by the isolated STA may include the identification information such as SSIDs of the connectable APs, the magnitude of received power, a signal-to-noise power ratio, the implementation status of SR communication or UL MU communication, and the like (the same as above).

The AP determines whether or not to change connection of the isolated STA to another AP on the basis of the information returned by the isolated STA and the like. Then, the AP transmits a signal inquiring whether or not the isolated STA is acceptable to another AP determined as a new connection destination of the isolated STA (SEQ2905). In a case where the another AP that has received the inquiry can accept the isolated STA, the another AP returns an answer signal indicating availability of acceptance (SEQ2906).

This inquiry signal includes the parameter information for the inquiry destination AP and the information regarding the isolated STA. The parameter information for the inquiry destination AP is set as a reward for the inquiry destination AP for accepting the isolated STA. The AP determines a value of the parameter information with which the inquiry destination AP can more easily obtain a communication opportunity according to the degree of wishing the another AP to accept the subordinate isolated STA, for example. Furthermore, the information regarding the isolated STA is any one of or a combination of an AID of the isolated STA, a Partial AID, current RSSI and SINR of the isolated STA, the number of other connectable APs of the isolated STA, an implementation status of the SR communication or the MU communication of the BSS to which the isolated STA belongs, a reason for being determined as an isolated STA.

Alternatively, the inquiry signal includes parameter information set by the transmission source AP itself of the signal, schedule information for performing the SR communication and the UL MU communication in the AP's own BSS, and the information regarding the isolated STA. The parameter information set by the transmission source AP itself and the schedule information for performing the SR communication and the UL MU communication in the AP's own BSS are set as a reward for the inquiry destination AP for accepting the isolated STA. The AP determines values of the parameter information and schedule information with which the inquiry destination AP can more easily obtain a communication opportunity according to the degree of wishing the another AP to accept the subordinate isolated STA, for example.

Furthermore, the AP that can accept the isolated STA transmits a signal requesting the isolated STA to be connected to the AP itself as the new connection destination (SEQ2911).

Note that, in a case where a plurality of isolated STAs to be determined is present, a sequence similar to the above-described sequence is performed for each of the individual isolated STAs.

Figure 30:
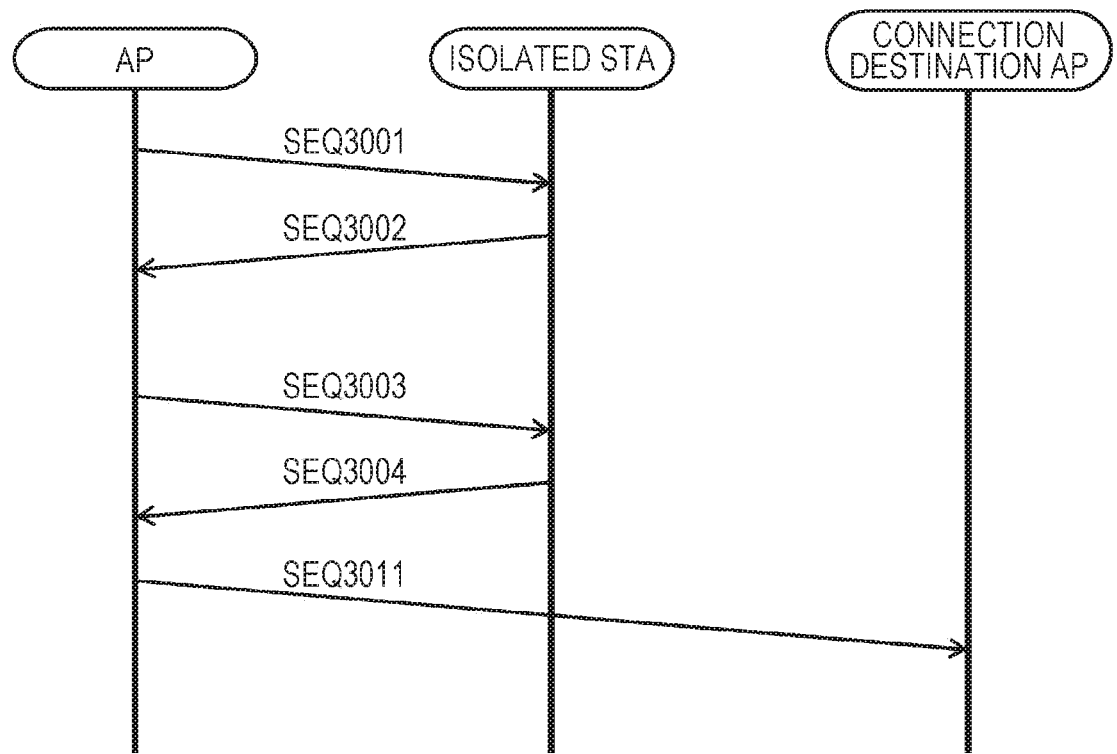
FIG. 30 is a diagram illustrating another modification of the sequence of the communication according to Example 2.

FIG. 30 illustrates another modification of the communication sequence performed among the AP, the subordinate isolated STA of the AP, and the connection destination AP in Example 2. The illustrated communication sequence assumes that the isolated STA cannot be connected to another AP (the connection destination AP in FIG. 30) and an isolated STA of the another AP is acceptable.

The AP requests the subordinate STA to transmit the information regarding the communication quality and the information regarding the implementation status of the SR communication and the UL MU communication (SEQ3001). In response to the request, the STA returns the requested information to the AP (SEQ3002). Then, as a result of the AP investigating the implementation statuses of SR communication and UL MU communication of each subordinate STA, the presence of an isolated STA falling outside a distribution of the entire subordinate STAs is revealed.

The AP requests the isolated STA to transmit the information regarding other connectable APs (SEQ3003). In response to the request, the isolated STA returns the information regarding other connectable APs to the AP (SEQ3004). The information regarding other connectable APs returned by the isolated STA may include the identification information such as SSIDs of the connectable APs, the magnitude of received power, a signal-to-noise power ratio, the implementation status of SR communication or UL MU communication, and the like (the same as above). Then, the AP determines whether or not to change the connection of the isolated STA to another AP.

In a case where the AP determines that the subordinate isolated STA is not connectable to another AP, the AP gives up delivery of the isolated STA to the another AP. Furthermore, in a case where the AP can accommodate an isolated STA connected to another AP, the AP notifies the surrounding AP that the AP can accept the isolated STA (SEQ3011). The AP is expected to receive preferential treatment of setting parameters (for example, a contention window size, an arbitration inter frame space (AIFS), a signal detection value, and the like) as a reward from the surrounding AP by accepting the isolated STA of another BSS even in a case where the subordinate isolated STA cannot be accepted by the surrounding AP.

Note that, in a case where a plurality of isolated STAs to be determined is present, a sequence similar to the above-described sequence is performed for each of the individual isolated STAs.

Since the AP basically determines whether or not to connect the subordinate isolated STA to another AP according to the processing procedures illustrated in FIGS. 5 and 6, detailed description is omitted here. Then, even in the modification of Example 2, the AP executes the operation A when determining to connect the subordinate isolated STA to another AP, and executes the operation B when determining not to connect the subordinate isolated STA to another AP.

Figure 31:
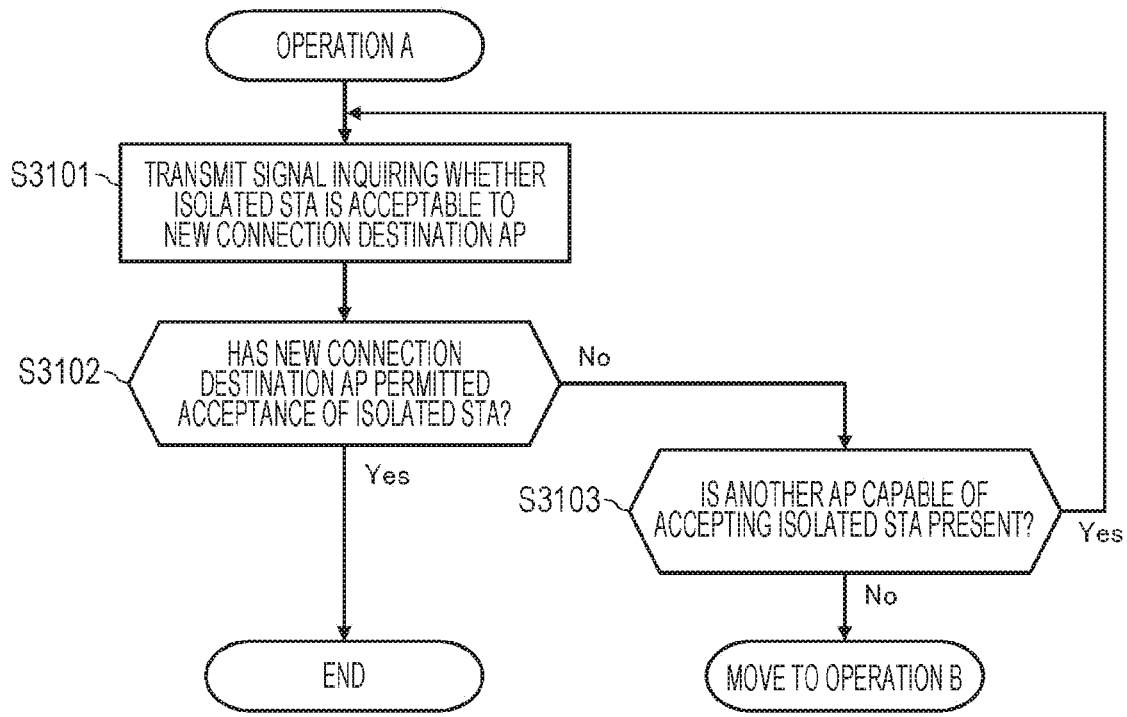
FIG. 31 is a flowchart illustrating a processing procedure of an operation A performed by an AP when the AP connects a subordinate isolated STA to another AP.

FIG. 31 illustrates a processing procedure of the "operation A" performed by the AP when the AP connects the subordinate isolated STA to another AP in the modification of Example 2 in the form of flowchart.

The AP transmits an inquiry signal inquiring whether or not the isolated STA is acceptable to another AP determined as a new connection destination of the isolated STA (step S3101).

Here, in a case where connection of the isolated STA is permitted by the new connection destination AP of the isolated STA (Yes in step S3102), the AP terminates the present processing. Hereinafter, the isolated STA is requested to connect to by the new connection destination AP, and new connection is performed.

On the other hand, in a case where the new connection destination AP does not permit the acceptance of the isolated STA (No in step S3102), the AP checks whether or not an AP to which the isolated STA is connectable is further present (step S3103)

In a case where an AP to which the isolated STA is connectable is further present (Yes in step S3103), the processing returns to step S3101, and an inquiry similar to the above inquiry is repeatedly performed for the another AP. Furthermore, in a case where an AP that can accept the isolated STA is no longer present (No in step S3103), the AP gives up changing the connection destination of the subordinate isolated STA and performs the operation B.

Figure 32:
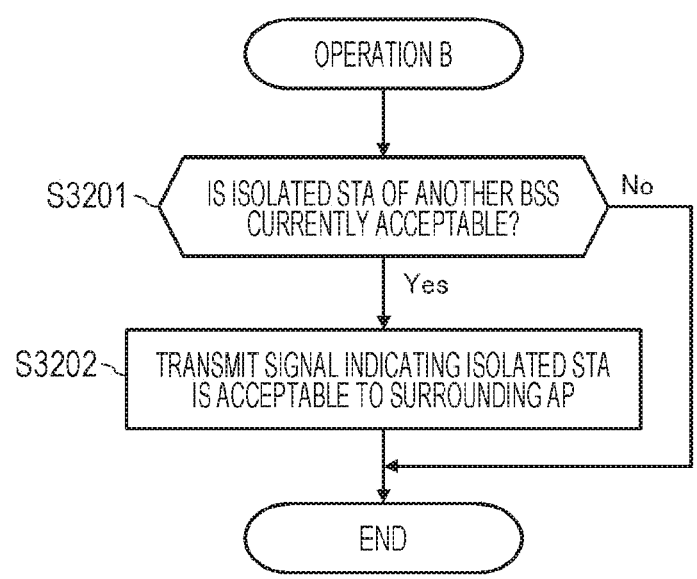
FIG. 32 is a flowchart illustrating a processing procedure of an operation B performed by an AP when the AP does not connect a subordinate isolated STA to another AP.

Furthermore, FIG. 32 illustrates a processing procedure of the "operation B", which is performed by the AP when another AP to which the subordinate isolated STA is connectable is not present or when the AP does not connect the subordinate isolated STA to another AP in a modification of Example 2, in the form of flowchart.

The AP determines whether or not the AP itself can currently accept an isolated STA of another BSS (step S3201). Then, in a case where the AP can accept the isolated STA of another BSS (Yes in step S3201), the AP notifies the surrounding APs of a signal indicating that the AP can accept the isolated STA (step S3202). On the other hand, in a case where the AP cannot accept the isolated STA of another BSS (No in step S3201), the AP terminates the processing without doing anything.

Figure 33:
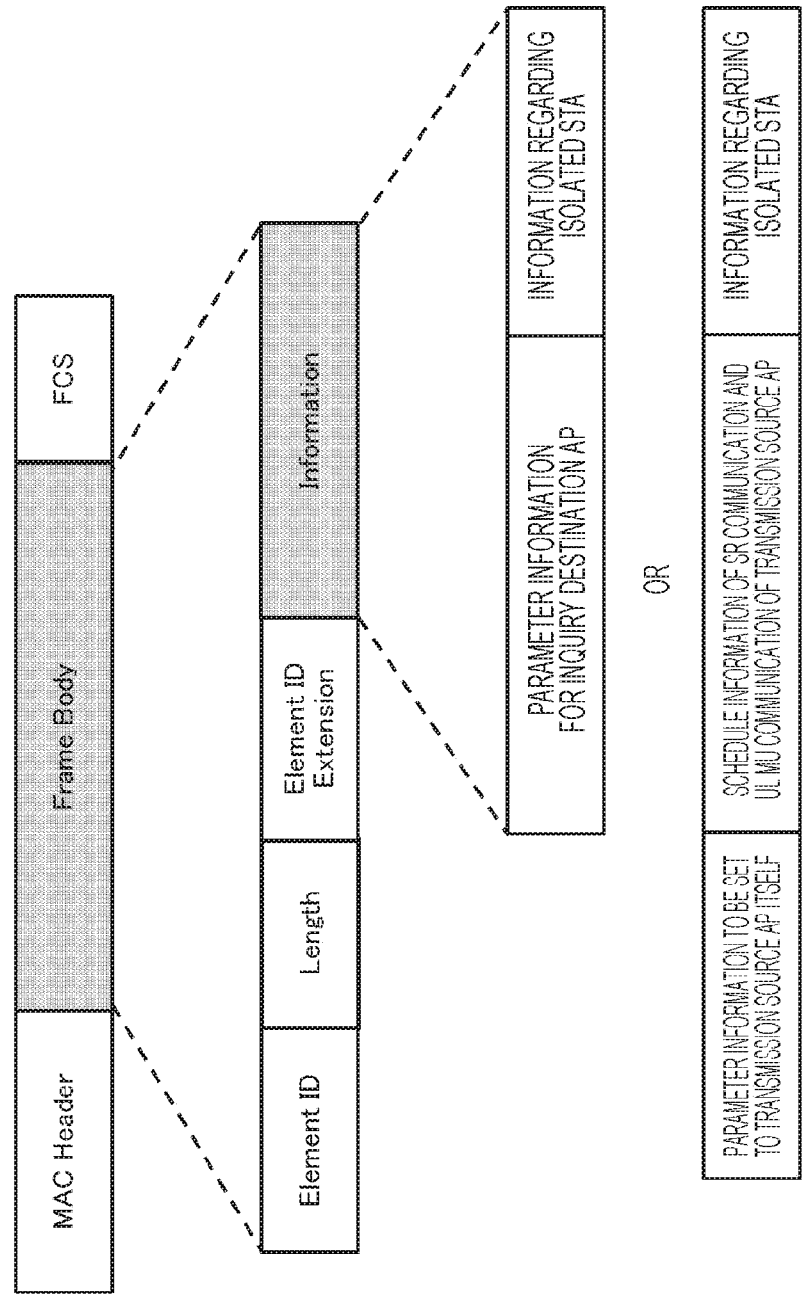
FIG. 33 is a diagram illustrating a frame configuration of a signal inquiring, by an AP, of another AP whether or not an isolated STA is acceptable.

FIG. 33 illustrates a frame configuration of the signal inquiring, by the AP, of another AP whether or not the isolated STA is acceptable in step S3201 in the flowchart in FIG. 32 and SEQ2905 in the communication sequence in FIG. 29. The illustrated frame includes a MAC header and a frame body, and a frame check sequence (FCS) is added at the end. The frame body includes an Element ID indicating the type of an information element, a Length indicating the length (data size) of the frame body, an Element ID Extension that is an extension part of the information element, and an information part (Information). Then, the information part (Information) of the frame body includes information for inquiring whether or not an isolated STA is acceptable.

The parameter information for the inquiry destination AP is parameter information (CW size, AIFS, TXOP, signal detection threshold value, and the like) set as a reward for the inquiry destination AP in step S603 in the flowchart illustrated in FIG. 6, similarly to Example 1. The AP generates the parameter information set as a reward for the inquiry destination AP for accepting the AP's own isolated STA. The AP determines a value of the parameter information with which the inquiry destination AP can more easily obtain a communication opportunity according to the degree of wishing the another AP to accept the subordinate isolated STA, for example. Furthermore, the inquiry destination AP sets or updates the inquiry destination AP's own parameters on the basis of the parameter information herein described in a case of accepting the isolated STA.

Furthermore, parameter information scheduled to set by the transmission source AP and the schedule information for performing the SR communication and the UL MU communication in the transmission source AP's own BSS may be described in the signal instead of the parameter information for the inquiry destination AP. The parameter information set by the transmission source AP itself and the schedule information for performing the SR communication and the UL MU communication in the AP's own BSS are set as a reward for the inquiry destination AP for accepting the isolated STA. The AP determines values of the parameter information and schedule information with which the inquiry destination AP can more easily obtain a communication opportunity according to the degree of wishing the another AP to accept the subordinate isolated STA, for example. Furthermore, the inquiry destination AP sets or updates the inquiry destination AP's own parameters on the basis of the parameter information herein described in a case of accepting the isolated STA.

Furthermore, status information regarding the isolated STA is any one of or a combination of an AID, a Partial AID, current RSSI and SINR of the appropriate isolated STA, the number of appropriate other connectable APs of the appropriate isolated STA, an implementation status of the SR communication or the MU communication of the BSS to which the appropriate isolated STA belongs, a reason for being determined as an isolated STA.

Figure 34:
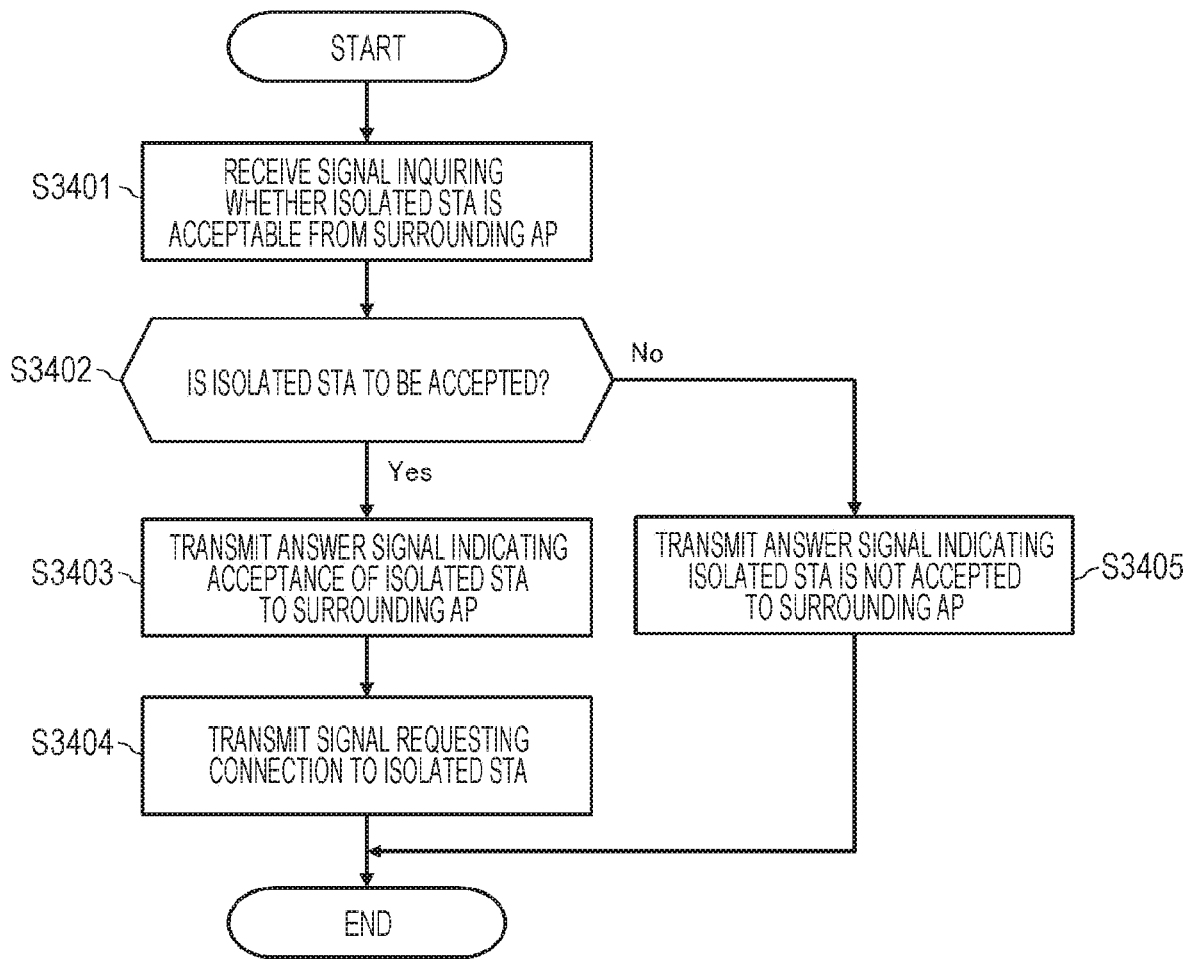
FIG. 34 is a flowchart illustrating a processing procedure of a signal inquiring whether or not an isolated STA is acceptable.

FIG. 34 illustrates a procedure for processing a signal inquiring whether or not an isolated STA is acceptable, which is received by the AP from another AP, in the form of flowchart.

When receiving the signal inquiring whether or not an isolated STA is acceptable from another AP (step S3401), the AP determines whether or not to accept the isolated STA (step S3402). The AP determines whether or not to accept the isolated STA on the basis of, for example, parameter information for the connection destination AP (or AP's own parameter information scheduled to set by the transmission source AP and the schedule information for performing the SR communication and the UL MU communication in the transmission source AP's own BSS), the status information regarding the isolated STA, and the like.

In a case where the AP accepts the inquired isolated STA (Yes in step S3402), the AP returns an answer signal indicating that the AP accepts the isolated STA to the inquiry source AP (step S3403), and then transmits a signal requesting the isolated STA to be connected to the AP itself (step S3404). Thereafter, the AP sets or updates the AP's own parameters on the basis of the parameter information described in the signal inquiring acceptance of the isolated STA.

On the other hand, in a case where the AP does not accept the inquired isolated STA (No in step S3402), the AP returns an answer signal indicating that the AP does not accept the isolated STA to the inquiry source AP (step S3405) and terminates the present processing.

The isolated STA that has received the signal requesting connection from the new connection destination AP in step S3404, the isolated STA performs connection change to the new connection destination AP according to a processing procedure similar to the procedure illustrated in FIG. 10, for example.

The modifications illustrated in FIGS. 29 and 30 have an effect that the isolated STA does not need to perform signaling regarding parameter setting, as compared with Example 2 illustrated in FIGS. 21 and 22. Furthermore, even in a case of a legacy terminal in which the technology disclosed in the present specification is not applied to the isolated STA, the new connection destination AP transmits an Association signal to the isolated STA immediately after the original connection destination AP transmits a Disassociation signal to the isolated STA, whereby the connection change of the isolated STA can be implemented.

INDUSTRIAL APPLICABILITY

The technology disclosed in the present specification has been described in detail with reference to the specific embodiments. However, it is obvious that those skilled in the art can make modifications and substitutions of the embodiments without departing from the gist of the technology disclosed in the present specification.

The technology disclosed in the present specification can be favorably applied to a wireless network environment in which a plurality of BSSs is present, and APs are not connected by a backhaul or the like. In particular, in a case of using the technology of the SR communication and the MU communication in each BSS, a weakly linked isolated STA is efficiently passed between the BSSs by applying the technology disclosed in the present specification, whereby implementation of high-speed communication is expected.

The technology disclosed in the present specification can be applied to a wireless communication system that complies with, for example, IEEE802.11ax, but of course can be similarly applied to systems that comply with various other communication standards.

In short, the technology disclosed in the present specification has been described in the form of examples, and the contents of description of the present specification should not be restrictively construed. To judge the gist of the technology disclosed in the present specification, the scope of claims should be taken into consideration.

Note that the technology disclosed in the present specification may have the following configurations.

(1) A communication device that operates as a base station, the communication device including:
a determination unit configured to determine a communication status in a BSS of the communication device; and
a control unit configured to control transmission and reception of a signal regarding connection change of a terminal to and from a surrounding base station according to a determination result by the determination unit.

(2) The communication device according to (1), in which
the control unit controls transmission of a request signal requesting a subordinate terminal to be connected to the surrounding base station.

(3) The communication device according to (2), in which
the determination unit determines presence of a small number of terminals each having a first parameter falling outside a distribution of entire subordinate terminals, the first parameter representing an index of communication quality of the terminal, and
the control unit controls transmission of the request signal requesting the small number of terminals to be connected to the surrounding base station.

(3-1) The communication device according to (3), in which
the determination unit determines an implementation status of spatial reuse communication or multi user communication of the subordinate terminal as the first parameter.

(4) The communication device according to (2) or (3), in which
the control unit controls transmission of the request signal including a second parameter regarding communication after the subordinate terminal changes connection to the surrounding base station.

(4-1) The communication device according to (4), in which
the control unit includes, as the second parameter, information regarding a communication resource set to a control unit's own base station after the subordinate terminal changes the connection to the surrounding base station, or information regarding a communication resource allowed to the surrounding base station, in the request signal.

(4-2) The communication device according to (4-1), in which
the information regarding a communication resource as the second parameter includes any one of or a combination of a contention windows size, an AIFS, and a signal detection threshold value in the control unit's own base station or the surrounding base station.

(4-3) The communication device according to any one of (4-1) or (4-2), in which
the information regarding a communication resource set to the control unit's own base station described in the request signal includes information regarding an implementation schedule of spatial reuse communication device or multi user communication device in the BSS of the communication device.

(4-4) The communication device according to any one of (4) to (4-3), in which
the control unit determines the second parameter on the basis of information of the first parameter.

(5) The communication device according to (1), in which
the control unit controls transmission of an inquiry signal inquiring of the surrounding base station availability of acceptance of a subordinate terminal.

(6) The communication device according to (5), in which
the determination unit determines presence of a small number of terminals each having a first parameter falling outside a distribution of entire subordinate terminals, the first parameter representing an index of communication quality of the terminal, and
the control unit controls transmission of the inquiry signal inquiring of the surrounding base station availability of acceptance of the small number of terminals.

(6-1) The communication device according to (6), in which
the determination unit determines an implementation status of spatial reuse communication or multi user communication of the subordinate terminal as the first parameter.

(7) The communication device according to any one of (5) or (6), in which
the control unit controls transmission of the inquiry signal including information regarding the number of subordinate terminals for which connection is to be changed and a communication status of each terminal, or the inquiry signal including information regarding a specific terminal that the surrounding base station is requested to accept.

(8) The communication device according to any one of (5) to (7), in which
the control unit controls transmission of the inquiry signal including a second parameter regarding communication after the subordinate terminal changes connection to the surrounding base station.

(8-1) The communication device according to (8), in which
the control unit includes, as the second parameter, information regarding a communication resource set to a control unit's own base station after the subordinate terminal changes the connection to the surrounding base station, or information regarding a communication resource allowed to the surrounding base station, in the inquiry signal.

(8-2) The communication device according to (8-1), in which
the information regarding the communication resource as the second parameter includes any one of or a combination of a contention windows size, an AIFS, and a signal detection threshold value in the control unit's own base station or the surrounding base station.

(8-3) The communication device according to any one of (8-1) or (8-2), in which
the information regarding a communication resource set to the control unit's own base station described in the inquiry signal includes information regarding an implementation schedule of spatial reuse communication device or multi user communication device in the BSS of the communication device.

(8-4) The communication device according to any one of (8) to (8-3), in which
the control unit determines the second parameter on the basis of information of the first parameter.

(9) The communication device according to any one of (5) to (8), in which,
when the control unit receives an answer signal indicating acceptance of a subordinate terminal from the surrounding base station, the control unit controls transmission of a request signal requesting the subordinate terminal to be connected to the surrounding base station.

(10) The communication device according to (9), in which
the control unit controls transmission of the request signal including information regarding a communication status in a BSS of the surrounding base station added to the answer signal.

(11) The communication device according to (1), in which,
when the control unit connects a subordinate terminal of a surrounding base station to a control unit's own base station, the control unit sets a communication parameter of the control unit's own base station on the basis of a second parameter included in the signal received from either the terminal or the surrounding base station.

(11-1) The communication device according to (11), in which
the control unit sets a communication parameter of the control unit's own base station on the basis of information regarding a communication resource set for the surrounding base station by the surrounding base station or information regarding a communication resource allowed to the control unit's own base station by the surrounding base station, the information being received from either the terminal or the surrounding base station when the control unit connects a subordinate terminal of the surrounding base station to the control unit's own base station, and included as the second parameter.

(11-2) The communication device according to any one of (11) or (11-1), in which
the control unit sets, as the communication parameter of the control unit's own base station, any one of or a combination of a contention windows size, AIFS, and a signal detection threshold value, or an implementation schedule of spatial reuse communication or multi user communication in the BSS of the communication device.

(12) The communication device according to (1), in which
the control unit controls, in response to reception of an inquiry signal inquiring availability of acceptance of a subordinate terminal of a surrounding base station from the surrounding base station, transmission of an answer signal answering the availability of acceptance of a subordinate terminal of the surrounding base station.

(13) The communication device according to (12), in which
the control unit determines the availability of acceptance of a subordinate terminal of the surrounding base station on the basis of information regarding a second parameter regarding communication after connecting the terminal added to the inquiry signal, or a traffic load in a control unit's own base station.

(13-1) The communication device according to (13), in which
the control unit determines the availability of acceptance of a subordinate terminal of the surrounding base station on the basis of information regarding a communication resource allowed to the control unit's own base station after connecting the terminal inquired to accept to the control unit's own base station, or information regarding a communication resource set to the surrounding base station by the surrounding base station, as the second parameter.

(14) The communication device according to (12) or (13), in which
the control unit controls transmission of the answer signal including information regarding a communication status in a BSS of a control unit's own base station.

(15) The communication device according to any one of (12) or (13), in which,
when the control unit accepts the subordinate terminal of the surrounding base station, the control unit attempts connection with the terminal.

(16) A communication method for operating as a base station, the communication method including:
a determination step of determining a communication status in a BSS of the base station; and
a control step of controlling transmission and reception of a signal regarding connection change of a terminal to and from a surrounding base station according to a determination result by the determination step.

(17) A communication device that operates as a terminal under control of a base station, the communication device including:
a transmission and reception unit configured to transmit and receive a signal; and
a control unit configured to control connection with a base station on the basis of a request signal requesting connection to another base station received from a connection destination base station.

(18) The communication device according to (17), in which
the control unit controls transmission of a second parameter regarding communication after connection is changed to the another base station, the second parameter being included in the request signal to the another base station after the connection is established.

(18-1) The communication device according to (18), in which
the control unit controls transmission of information as the second parameter to the another base station after the connection is established, the information being regarding a communication resource set to an original connection destination base station after connection is changed to the another base station or being regarding a communication resource allowed to the another base station.

(18-2) The communication device according to (18-1), in which
the information regarding the communication resource as the second parameter includes any one of or a combination of a contention windows size, an AIFS, and a signal detection threshold value in an original connection destination or the another base station.

(18-3) The communication device according to any one of (17) or (18), in which
the control unit sets a communication parameter of the control unit's own base station in a BSS of the another base station on the basis of information regarding an implementation status of communication in the BSS of the another base station described in the request signal, after connection is changed to the another base station.

(19) The communication device according to any one of (17) or (18), in which
the control unit controls transmission of information regarding an implementation schedule of spatial reuse communication or multi user communication in a BSS of the original connection destination base station after connection is changed to the another base station, the information being included in the request signal to the another base station after the connection is established.

(20) A communication method for operating as a terminal under control of a base station, the communication method including:

a reception step of receiving a request signal requesting connection to another base station received from a connection destination base station; and a control step of controlling connection with a base station on the basis of the request signal.

REFERENCE SIGNS LIST

200 Communication device
201 Data processing unit
202 Control unit
203 Communication unit
204 Power supply unit
211 Modulation and demodulation unit
212 Spatial signal processing unit
213 Channel estimation unit
214 Wireless interface unit
215 Amplification unit
216 Antenna

The invention claimed is:

1. A communication device configured to operate as a first base station, the communication device comprising:
a circuitry configured to:
determine a communication quality in a first basic service set (BSS), wherein the first BSS includes the communication device;
control transmission and reception of a signal regarding one of a connection change of a user terminal device of a plurality of user terminal devices to a second base station or the connection change of the user terminal device from the second base station, based on the determination of the communication quality;
determine a presence of a specific number of user terminal devices of the plurality of user terminal devices, wherein
each user terminal device of the specific number of user terminal devices has a first parameter that falls outside a distribution of parameter information of the plurality of user terminal devices, and
the first parameter represents an index of a communication quality of each user terminal device of the specific number of user terminal devices; and
control transmission of a request signal that requests the specific number of user terminal devices to connect to the second base station.

2. The communication device according to claim 1, wherein
the circuitry is further configured to control the transmission of the request signal including a second parameter regarding communication after the specific number of user terminal devices changes connection to the second base station, and
the second parameter relates to communications of the second base station and includes at least a signal detection threshold value.

3. The communication device according to claim 1, wherein
the circuitry is further configured to control transmission of an inquiry signal inquiring an availability of the second base station for acceptance of the specific number of user terminal devices.

4. The communication device according to claim 3, wherein
the circuitry is further configured to control the transmission of one of the inquiry signal including:
information regarding the specific number of user terminal devices for which connection is to be changed, and the communication quality of each user terminal device of the specific number of user terminal devices, or
the inquiry signal including information regarding a specific user terminal device that the second base station is requested to accept.

5. The communication device according to claim 3, wherein
the circuitry is further configured to control the transmission of the inquiry signal including a second parameter regarding communication after the specific number of user terminal devices changes connection to the second base station, and
the second parameter relates to communications of the second base station and includes at least a signal detection threshold value.

6. The communication device according to claim 3, wherein
the circuitry is further configured to:
receive an answer signal, indicating the acceptance of the specific number of user terminal devices, from the second base station; and
control the transmission of the request signal requesting the specific number of user terminal devices to be connected to the second base station.

7. The communication device according to claim 6, wherein
the circuitry is further configured to control the transmission of the request signal including information regarding a communication quality in a second BSS,
the second BSS includes the second base station, and
the information regarding the communication quality is added to the answer signal.

8. The communication device according to claim 1, wherein
the circuitry is further configured to
set the first parameter for the first base station based on a second parameter included in the signal received from one of a user terminal device of the second base station or the second base station, based on a connection of the user terminal device of the second base station to the first base station.

9. The communication device according to claim 1, wherein
the circuitry is further configured to:
receive an inquiry signal from the second base station that inquires an availability of acceptance of a user terminal device of the second base station; and
control, in response to the reception of the inquiry signal, transmission of an answer signal answering the availability of acceptance of the user terminal device of the second base station.

10. The communication device according to claim 9, wherein
the circuitry is further configured to determine the availability of acceptance of the user terminal device of the second base station based on one of information regarding a second parameter regarding communication after connecting the user terminal device, or a traffic load in the first base station, the information regarding the second parameter is added to the inquiry signal, and the second parameter relates to communications of the second base station and includes at least a signal detection threshold value.

11. The communication device according to claim 9, wherein the circuitry is further configured to control the transmission of the answer signal including information regarding the communication quality in the first BSS.

12. The communication device according to claim 9, wherein the circuitry is further configured to:

accept the user terminal device of the second base station; and attempt connection with the user terminal device of the second base station based on the acceptance of the user terminal device.

13. A communication method for operating as a first base station, comprising:

determining a communication quality in a first basic service set (BSS), wherein the first BSS includes the first base station;

controlling transmission and reception of a signal regarding one of a connection change of a user terminal device of a plurality of user terminal devices to a second base station or the connection change of the user terminal device from the second base station, based on the determination of communication quality;

determining a presence of a specific number of user terminal devices of the plurality of user terminal devices, wherein each user terminal device of the specific number of user terminal devices has a parameter that falls outside a distribution of parameter information of the plurality of user terminal devices, and the parameter represents an index of a communication quality of each user terminal device of the specific number of user terminal devices; and controlling transmission of a request signal that requests the specific number of user terminal devices to connect to the second base station.

14. A communication device configured to operate as a user terminal device under control of a first base station, the communication device comprising:

circuitry configured to:

transmit and receive a signal;

receive a request signal from the first base station requesting a change in connection to a second base station;

control connection with the second base station based on the received request signal; and control transmission of a parameter regarding communication after the change in connection to the second base station, wherein the parameter is included in the request signal and is transmitted to the second base station after the connection is established, and the parameter relates to communications of the second base station and includes at least a signal detection threshold value.

15. The communication device according to claim 14, wherein the circuitry is further configured to control transmission of information regarding an implementation schedule of one of spatial reuse communication or multi user communication in a basic service set (BSS) that includes the first base station after connection is changed to the second base station, and the information is included in the request signal and is transmitted to the second base station after the connection is established.

16. A communication method for operating as a user terminal device under control of a first base station, the communication method comprising:

receiving a request signal from the first base station requesting a change in connection to a second base station;

controlling connection with the second base station based on the received request signal; and controlling transmission of a parameter regarding communication after the change in connection to the second base station, wherein the parameter is included in the request signal and is transmitted to the second base station after the connection is established, and the parameter relates to communications of the second base station and includes at least a signal detection threshold value.

* * * * *